(12) United States Patent
Forutanpour et al.

(10) Patent No.: US 12,475,756 B2
(45) Date of Patent: Nov. 18, 2025

(54) CONNECTOR CARRIER FOR ELECTRONIC DEVICE KIOSK

(71) Applicant: ecoATM, LLC, San Diego, CA (US)

(72) Inventors: Babak Forutanpour, San Diego, CA (US); Ted Ray Gooding, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 1052 days.

(21) Appl. No.: 17/445,178

(22) Filed: Aug. 16, 2021

(65) Prior Publication Data

US 2022/0051212 A1 Feb. 17, 2022

Related U.S. Application Data

(60) Provisional application No. 63/066,794, filed on Aug. 17, 2020.

(51) Int. Cl.
*G07F 7/00* (2006.01)
*G06Q 10/30* (2023.01)
(Continued)

(52) U.S. Cl.
CPC ............ *G07F 11/005* (2013.01); *G06Q 10/30* (2013.01); *G06Q 20/18* (2013.01); *G07F 7/005* (2013.01);
(Continued)

(58) Field of Classification Search
CPC .......... G07F 11/005; G07F 7/005; G07F 7/06; G07F 9/001; G07F 9/002; G07F 9/0235;
(Continued)

(56) References Cited

U.S. PATENT DOCUMENTS

| | | | |
|---|---|---|---|
| 1,327,315 A | | 1/1920 | Davies |
| 2,817,725 A | * | 12/1957 | Rochfort ............... H01H 13/186 200/332 |

(Continued)

FOREIGN PATENT DOCUMENTS

| | | |
|---|---|---|
| CA | 2760863 | 11/2010 |
| CA | 2818533 A1 | 5/2012 |

(Continued)

OTHER PUBLICATIONS

2006 Florida Statutes Title XXXIII, Chapter 538, Sections 538.03 and 538.04, 7 pages.

(Continued)

*Primary Examiner* — Jeffrey A Shapiro
(74) *Attorney, Agent, or Firm* — Perkins Coie LLP

(57) ABSTRACT

Various embodiments of kiosks for purchasing mobile phones and other mobile electronic devices from users are disclosed herein. In some embodiments, the kiosks include an apparatus to position an electrical connector for connection to a mobile device. This apparatus enables the kiosk to connect to the mobile device to electrically inspect the mobile device, and the associated electrical connectors and cables are not subjected to repeated pulling and other rough handling that can lead to premature wear and tear. Accordingly, use of connector carriers configured in accordance with the present technology can lead to longer connector/cable service life, reduced maintenance, and greater kiosk up-time. In some embodiments, the apparatus can include a camshaft having one or more cam lobes positioned to act against one or more cam followers, e.g., carrying one or more electrical connectors.

23 Claims, 9 Drawing Sheets

(51) Int. Cl.

| | | |
|---|---|---|
| *G06Q 20/18* | (2012.01) | |
| *G07F 9/00* | (2006.01) | |
| *G07F 9/02* | (2006.01) | |
| *G07F 11/00* | (2006.01) | |
| *G07F 17/00* | (2006.01) | |
| *H02J 50/80* | (2016.01) | |
| *H04B 1/3877* | (2015.01) | |
| *H02J 7/02* | (2016.01) | |

(52) U.S. Cl.
CPC .............. *G07F 9/001* (2020.05); *G07F 9/002* (2020.05); *G07F 9/0235* (2020.05); *G07F 17/0014* (2013.01); *H04B 1/3877* (2013.01); *H02J 7/02* (2013.01); *H02J 50/80* (2016.02)

(58) Field of Classification Search
CPC .... G07F 17/0014; G06Q 10/30; G06Q 20/18; G06Q 20/085; H04B 1/3877; H04M 1/724092; H04M 1/72409; H04M 1/724098; H04W 88/02; H01R 24/38; H01R 12/7058; H01R 13/62983; F16H 31/004; F16H 21/28
USPC .................................. 455/88, 559, 571, 575.9
See application file for complete search history.

(56) References Cited

U.S. PATENT DOCUMENTS

| | | | |
|---|---|---|---|
| 3,808,439 A | 4/1974 | Renius | |
| 4,248,334 A | 2/1981 | Hanley et al. | |
| 4,519,522 A | 5/1985 | McElwee | |
| 4,593,820 A | 6/1986 | Antonie | |
| 4,715,709 A | 12/1987 | Sekine et al. | |
| 4,821,118 A | 4/1989 | Lafreniere | |
| 4,845,636 A | 7/1989 | Walker | |
| 4,870,357 A | 9/1989 | Young et al. | |
| 4,878,736 A | 11/1989 | Hekker et al. | |
| 4,893,789 A | 1/1990 | Novorsky | |
| 4,927,051 A | 5/1990 | Falk et al. | |
| 4,951,308 A | 8/1990 | Bishop et al. | |
| 5,025,344 A | 6/1991 | Maly et al. | |
| 5,027,074 A | 6/1991 | Haferstat | |
| 5,077,462 A | 12/1991 | Newell et al. | |
| 5,091,773 A | 2/1992 | Fouche et al. | |
| 5,105,149 A | 4/1992 | Tokura | |
| 5,159,560 A | 10/1992 | Newell et al. | |
| 5,216,502 A | 6/1993 | Katz | |
| 5,280,170 A | 1/1994 | Baldwin | |
| 5,319,459 A | 6/1994 | Mochizuki et al. | |
| 5,339,096 A | 8/1994 | Beaufort et al. | |
| 5,413,454 A | 5/1995 | Movesian | |
| 5,419,438 A | 5/1995 | Squyres et al. | |
| 5,436,554 A | 7/1995 | Decker | |
| 5,482,140 A | 1/1996 | Moore | |
| 5,570,920 A | 11/1996 | Crisman et al. | |
| 5,572,444 A | 11/1996 | Lentz et al. | |
| 5,610,710 A | 3/1997 | Canfield et al. | |
| 5,717,780 A | 2/1998 | Mitsumune et al. | |
| 5,747,784 A | 5/1998 | Walter et al. | |
| 5,748,084 A | 5/1998 | Isikoff | |
| 5,775,806 A | 7/1998 | Allred | |
| 5,839,058 A | 11/1998 | Phillips et al. | |
| 5,871,371 A | 2/1999 | Rothenberger et al. | |
| 5,920,338 A | 7/1999 | Katz | |
| 5,937,396 A | 8/1999 | Konya | |
| 5,949,901 A | 9/1999 | Nichani et al. | |
| 5,965,858 A | 10/1999 | Suzuki et al. | |
| 5,966,654 A | 10/1999 | Croughwell et al. | |
| 5,987,159 A | 11/1999 | Nichani | |
| 5,988,431 A | 11/1999 | Roe | |
| 6,029,851 A | 2/2000 | Jenkins et al. | |
| 6,041,229 A | 3/2000 | Turner | |
| 6,055,512 A | 4/2000 | Dean et al. | |
| 6,100,986 A | 8/2000 | Rydningen | |
| 6,170,702 B1 | 1/2001 | Zettler et al. | |
| 6,181,805 B1 | 1/2001 | Koike et al. | |
| 6,228,008 B1 | 5/2001 | Pollington et al. | |
| 6,234,812 B1 | 5/2001 | Ivers et al. | |
| 6,259,827 B1 | 7/2001 | Nichani | |
| 6,264,104 B1 | 7/2001 | Jenkins et al. | |
| 6,323,782 B1 | 11/2001 | Stephens et al. | |
| 6,330,354 B1 | 12/2001 | Companion et al. | |
| 6,330,958 B1 | 12/2001 | Ruskin et al. | |
| 6,393,095 B1 | 5/2002 | Robinson | |
| 6,462,644 B1 | 10/2002 | Howell et al. | |
| 6,529,837 B1 | 3/2003 | Kang | |
| 6,535,637 B1 | 3/2003 | Wootton et al. | |
| 6,573,886 B1 | 6/2003 | Lehtinen et al. | |
| 6,587,581 B1 | 7/2003 | Matsuyama et al. | |
| 6,595,684 B1 | 7/2003 | Casagrande et al. | |
| 6,597,552 B1 | 7/2003 | Griepentrog et al. | |
| 6,633,377 B1 | 10/2003 | Weiss et al. | |
| 6,667,800 B1 | 12/2003 | Larsson et al. | |
| 6,687,679 B1 | 2/2004 | Van Luchene | |
| 6,748,296 B2 | 6/2004 | Banerjee et al. | |
| 6,754,637 B1 | 6/2004 | Stenz | |
| 6,758,370 B2 | 7/2004 | Cooke et al. | |
| 6,798,528 B1 | 9/2004 | Hartman | |
| 6,822,422 B2 | 11/2004 | Sagawa | |
| 6,842,596 B2 | 1/2005 | Morii et al. | |
| 6,854,656 B2 | 2/2005 | Matsumori | |
| 6,947,941 B1 | 9/2005 | Koon | |
| D512,964 S | 12/2005 | Kissinger et al. | |
| 7,062,454 B1 | 6/2006 | Giannini et al. | |
| 7,069,236 B1 | 6/2006 | Tsunenari | |
| 7,076,449 B2 | 7/2006 | Tsunenari et al. | |
| 7,086,592 B2 | 8/2006 | Wagner et al. | |
| 7,178,720 B1 | 2/2007 | Strubbe et al. | |
| 7,201,125 B2 * | 4/2007 | Evans | F01L 1/185 |
| | | | 123/90.39 |
| 7,234,609 B2 | 6/2007 | DeLazzer et al. | |
| 7,251,458 B2 | 7/2007 | O'Connell | |
| 7,268,345 B2 | 9/2007 | Schultz | |
| 7,334,729 B2 | 2/2008 | Brewington | |
| 7,343,319 B1 | 3/2008 | Jen | |
| 7,407,392 B1 | 8/2008 | Cooke et al. | |
| 7,408,674 B2 | 8/2008 | Moro et al. | |
| 7,431,158 B2 | 10/2008 | Yamada | |
| 7,455,226 B1 | 11/2008 | Hammond et al. | |
| 7,520,666 B2 | 4/2009 | Pevzner et al. | |
| 7,529,687 B1 | 5/2009 | Phan | |
| 7,567,344 B2 | 7/2009 | LeBlanc et al. | |
| 7,642,687 B2 | 1/2010 | Kageyama et al. | |
| 7,646,193 B2 | 1/2010 | Suzuki et al. | |
| 7,649,450 B2 | 1/2010 | Campion et al. | |
| 7,702,108 B2 | 4/2010 | Amon et al. | |
| 7,735,125 B1 | 6/2010 | Alvarez et al. | |
| 7,761,331 B2 | 7/2010 | Low et al. | |
| 7,783,379 B2 | 8/2010 | Beane et al. | |
| 7,848,833 B2 | 12/2010 | Li | |
| 7,881,965 B2 | 2/2011 | Bowles et al. | |
| 7,890,373 B2 | 2/2011 | Junger | |
| D640,199 S | 6/2011 | Wilson | |
| 8,010,402 B1 | 8/2011 | Sharma et al. | |
| 8,019,588 B1 | 9/2011 | Wohlberg et al. | |
| 8,025,229 B2 | 9/2011 | Hammond et al. | |
| 8,031,930 B2 | 10/2011 | Wang et al. | |
| 8,107,243 B2 | 1/2012 | Guccione et al. | |
| 8,112,325 B2 | 2/2012 | Foy et al. | |
| 8,142,199 B1 | 3/2012 | Almouli | |
| 8,156,008 B2 | 4/2012 | Bae et al. | |
| 8,195,511 B2 | 6/2012 | Bowles et al. | |
| 8,200,533 B2 | 6/2012 | Librizzi et al. | |
| 8,200,736 B2 | 6/2012 | Shi | |
| 8,215,546 B2 | 7/2012 | Lin et al. | |
| 8,239,262 B2 | 8/2012 | Bowles et al. | |
| 8,254,883 B2 | 8/2012 | Uchida | |
| 8,266,008 B1 | 9/2012 | Siegel et al. | |
| 8,340,815 B2 | 12/2012 | Peters et al. | |
| 8,369,987 B2 | 2/2013 | Claessen | |
| 8,401,914 B1 | 3/2013 | Kim | |
| 8,417,234 B2 | 4/2013 | Sanding et al. | |
| 8,423,404 B2 | 4/2013 | Bowles et al. | |

(56) References Cited

U.S. PATENT DOCUMENTS

| | | |
|---|---|---|
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,792,597 B1 | 10/2017 | Abbott |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 9,972,046 B2 | 5/2018 | Ackerman |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,528,992 B2 | 1/2020 | Yost |
| 10,529,008 B1 | 1/2020 | Pritchard |
| 10,565,629 B2 | 2/2020 | Hartman |
| 10,572,946 B2 | 2/2020 | Bowles et al. |
| 10,679,279 B2 | 6/2020 | Ward |
| 10,740,891 B2 | 8/2020 | Chen et al. |
| 10,803,527 B1 | 10/2020 | Zankat et al. |
| 10,810,732 B2 | 10/2020 | Dwivedi et al. |
| 10,824,942 B1 | 11/2020 | Bhotika et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 10,977,700 B2 | 4/2021 | Bordeleau et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,122,034 B2 | 9/2021 | Cicchitto |
| 11,126,973 B2 | 9/2021 | Silva et al. |
| 11,164,000 B2 | 11/2021 | Lee et al. |
| 11,232,412 B2 | 1/2022 | Hunt et al. |
| 11,288,789 B1 | 3/2022 | Chen et al. |
| 11,302,038 B2 | 4/2022 | Muendel et al. |
| 11,315,093 B2 | 4/2022 | Bowles |
| 11,321,768 B2 | 5/2022 | Beauchamp |
| 11,341,471 B2 | 5/2022 | Dion et al. |
| 11,379,886 B1 | 7/2022 | Fields et al. |
| 11,386,740 B2 | 7/2022 | Shah |
| 11,417,068 B1 | 8/2022 | Burris et al. |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,631,096 B2 | 4/2023 | Schubert et al. |
| 11,657,631 B2 | 5/2023 | Sagnoas |
| 11,843,206 B2 | 12/2023 | Forutanpour et al. |
| 11,907,915 B2 | 2/2024 | Bowles et al. |
| 12,033,454 B2 | 7/2024 | Forutanpour et al. |
| 12,045,973 B2 | 7/2024 | Johnson et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0046122 A1* | 4/2002 | Barber ............... G06Q 30/04 705/17 |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0158789 A1 | 8/2003 | Miura et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0184651 A1 | 9/2004 | Nordbryhn |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1 | 12/2004 | Walker et al. |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |

(56) References Cited

U.S. PATENT DOCUMENTS

| | | |
|---|---|---|
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2006/0287929 A1 | 12/2006 | Bae et al. |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0145727 A1 | 6/2009 | Johns |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0174596 A1 | 7/2010 | Gilman |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0296339 A1 | 12/2011 | Kang |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0095875 A1 | 4/2012 | Guthrie |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0209783 A1 | 8/2012 | Smith et al. |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0169413 A1 | 7/2013 | Schuessler |
| 2013/0173430 A1 | 7/2013 | Benjamin |
| 2013/0173434 A1 | 7/2013 | Hartman |

(56) References Cited

U.S. PATENT DOCUMENTS

| | | |
|---|---|---|
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0028449 A1 | 1/2014 | Sigal et al. |
| 2014/0038556 A1 | 2/2014 | DeSousa |
| 2014/0046748 A1 | 2/2014 | Nagarajan |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0149201 A1 | 5/2014 | Abbott |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0267691 A1 | 9/2014 | Humphrey |
| 2014/0278244 A1 | 9/2014 | Humphrey et al. |
| 2014/0297368 A1 | 10/2014 | Ferder |
| 2014/0330685 A1 | 11/2014 | Nazzari |
| 2014/0347473 A1 | 11/2014 | Wolff et al. |
| 2015/0006281 A1 | 1/2015 | Takahashi |
| 2015/0046343 A1 | 2/2015 | Martini |
| 2015/0066677 A1 | 3/2015 | Bowles et al. |
| 2015/0088698 A1 | 3/2015 | Ackerman |
| 2015/0088731 A1 | 3/2015 | Ackerman |
| 2015/0120485 A1 | 4/2015 | Nash |
| 2015/0161714 A1 | 6/2015 | Fainshtein |
| 2015/0170237 A1 | 6/2015 | Powell |
| 2015/0177330 A1 | 6/2015 | Morris |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0294278 A1 | 10/2015 | Nguyen |
| 2015/0309912 A1 | 10/2015 | Nguyen et al. |
| 2015/0317619 A1 | 11/2015 | Curtis |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0292710 A1 | 10/2016 | Casselle |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0278191 A1 | 9/2017 | Tassone et al. |
| 2017/0301010 A1* | 10/2017 | Bowles .............. G06Q 30/0278 |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0101810 A1 | 4/2018 | Feng et al. |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0165655 A1 | 6/2018 | Marcelle et al. |
| 2018/0240144 A1 | 8/2018 | Curtis |
| 2018/0255047 A1 | 9/2018 | Cicchitto |
| 2018/0293566 A1 | 10/2018 | Engles et al. |
| 2018/0293664 A1 | 10/2018 | Zhang et al. |
| 2018/0300776 A1 | 10/2018 | Yost |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2019/0017863 A1 | 1/2019 | Saltzman |
| 2019/0019147 A1 | 1/2019 | McCarty et al. |
| 2019/0051090 A1 | 2/2019 | Goldberg et al. |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0156611 A1 | 5/2019 | Redhead |
| 2019/0166278 A1 | 5/2019 | Hiyama et al. |
| 2019/0222748 A1 | 7/2019 | Weir et al. |
| 2019/0251777 A1 | 8/2019 | Abdelmalak et al. |
| 2019/0272628 A1 | 9/2019 | Tsou |
| 2019/0279431 A1 | 9/2019 | Wurmfeld et al. |
| 2019/0318465 A1 | 10/2019 | Nguyen |
| 2019/0372827 A1 | 12/2019 | Vasseur et al. |
| 2019/0375300 A1* | 12/2019 | Lyon ....................... B60L 53/16 |
| 2020/0020097 A1 | 1/2020 | Do et al. |
| 2020/0042795 A1 | 2/2020 | Lee et al. |
| 2020/0042969 A1 | 2/2020 | Ray |
| 2020/0066067 A1 | 2/2020 | Herman et al. |
| 2020/0090137 A1 | 3/2020 | Bowles et al. |
| 2020/0104720 A1 | 4/2020 | Boa et al. |
| 2020/0104868 A1 | 4/2020 | Schubert et al. |
| 2020/0175481 A1 | 6/2020 | Pham |
| 2020/0175669 A1 | 6/2020 | Bian et al. |
| 2020/0202319 A1 | 6/2020 | Forutanpour et al. |
| 2020/0202405 A1 | 6/2020 | Glickman et al. |
| 2020/0202419 A1 | 6/2020 | Beauchamp |
| 2020/0241891 A1 | 7/2020 | Li et al. |
| 2020/0265487 A1 | 8/2020 | Forutanpour et al. |
| 2020/0265666 A1* | 8/2020 | Yamamiya ............. G07D 9/008 |
| 2020/0342442 A1 | 10/2020 | Curtis |
| 2020/0393742 A1 | 12/2020 | Dion et al. |
| 2020/0410793 A1 | 12/2020 | Folco |
| 2021/0012315 A1 | 1/2021 | Priebatsch |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0150773 A1 | 5/2021 | Muendel et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |
| 2021/0209746 A1 | 7/2021 | Johnson et al. |
| 2021/0217076 A1 | 7/2021 | Kruper et al. |
| 2021/0224867 A1 | 7/2021 | Bordeleau et al. |
| 2021/0254966 A1 | 8/2021 | Hur et al. |
| 2021/0255240 A1 | 8/2021 | McGrath |
| 2021/0264483 A1 | 8/2021 | Hirata |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0327203 A1 | 10/2021 | Shah |
| 2021/0343030 A1 | 11/2021 | Sagnoas |
| 2021/0357545 A1 | 11/2021 | Sugawara et al. |

(56) References Cited

U.S. PATENT DOCUMENTS

| | | |
|---|---|---|
| 2022/0027879 A1 | 1/2022 | Bowles et al. |
| 2022/0050897 A1 | 2/2022 | Gaddam et al. |
| 2022/0051300 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0164833 A1 | 5/2022 | Dion et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0262189 A1 | 8/2022 | Dion et al. |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0188998 A1 | 6/2023 | Zellner et al. |
| 2023/0196865 A1 | 6/2023 | Forutanpour et al. |
| 2023/0238751 A1 | 7/2023 | Forutanpour et al. |
| 2023/0259910 A1 | 8/2023 | Forutanpour et al. |
| 2023/0264871 A1 | 8/2023 | Williams et al. |
| 2023/0274346 A1 | 8/2023 | Bowles et al. |
| 2023/0297973 A1 | 9/2023 | Bowles et al. |
| 2023/0297974 A1 | 9/2023 | Bowles et al. |
| 2023/0306384 A1 | 9/2023 | Bowles et al. |
| 2023/0371729 A1 | 11/2023 | Williams et al. |
| 2023/0394904 A1 | 12/2023 | Forutanpour et al. |
| 2024/0005289 A1 | 1/2024 | Silva et al. |
| 2024/0087276 A1 | 3/2024 | Silva et al. |
| 2024/0144461 A1 | 5/2024 | Forutanpour et al. |
| 2024/0185317 A1 | 6/2024 | Forutanpour et al. |
| 2024/0249251 A1 | 7/2024 | Bowles |
| 2024/0249321 A1 | 7/2024 | Forutanpour et al. |
| 2024/0265364 A1 | 8/2024 | Forutanpour et al. |
| 2024/0265470 A1 | 8/2024 | Bowles et al. |
| 2024/0289753 A1 | 8/2024 | Bowles |
| 2024/0321033 A1 | 9/2024 | Forutanpour et al. |
| 2024/0346463 A1 | 10/2024 | Hunt et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 202394296 | 8/2012 |
| CN | 102654927 | 9/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |
| CN | 208086545 U | 11/2018 |
| CN | 208172834 U | 11/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111009073 A | 4/2020 |
| CN | 111080184 A | 4/2020 |
| CN | 210348162 U | 4/2020 |
| CN | 111175318 A | 5/2020 |
| CN | 111210473 A | 5/2020 |
| CN | 305767220 S | 5/2020 |

(56) References Cited

FOREIGN PATENT DOCUMENTS

| | | | |
|---|---|---|---|
| CN | 111238430 A | 6/2020 |
| CN | 111262987 A | 6/2020 |
| CN | 111272067 A | 6/2020 |
| CN | 111272388 A | 6/2020 |
| CN | 111272393 A | 6/2020 |
| CN | 111273704 A | 6/2020 |
| CN | 111277466 A | 6/2020 |
| CN | 111277659 A | 6/2020 |
| CN | 111277695 A | 6/2020 |
| CN | 111277696 A | 6/2020 |
| CN | 111290660 A | 6/2020 |
| CN | 111290949 A | 6/2020 |
| CN | 111291661 A | 6/2020 |
| CN | 111292302 A | 6/2020 |
| CN | 111294454 A | 6/2020 |
| CN | 111294459 A | 6/2020 |
| CN | 111307429 A | 6/2020 |
| CN | 111311556 A | 6/2020 |
| CN | 111311687 A | 6/2020 |
| CN | 111311749 A | 6/2020 |
| CN | 111314445 A | 6/2020 |
| CN | 111314535 A | 6/2020 |
| CN | 111325715 A | 6/2020 |
| CN | 111325716 A | 6/2020 |
| CN | 111325717 A | 6/2020 |
| CN | 111325901 A | 6/2020 |
| CN | 210666955 U | 6/2020 |
| CN | 305818424 S | 6/2020 |
| CN | 111439560 A | 7/2020 |
| CN | 211149556 U | 7/2020 |
| CN | 305955503 S | 7/2020 |
| CN | 211291337 U | 8/2020 |
| CN | 211296771 U | 8/2020 |
| CN | 211402187 U | 9/2020 |
| CN | 211515235 U | 9/2020 |
| CN | 211538600 U | 9/2020 |
| CN | 111830293 A | 10/2020 |
| CN | 111830354 A | 10/2020 |
| CN | 111860890 A | 10/2020 |
| CN | 111860891 A | 10/2020 |
| CN | 211630227 U | 10/2020 |
| CN | 306113050 S | 10/2020 |
| CN | 306113051 S | 10/2020 |
| CN | 306113052 S | 10/2020 |
| CN | 212023984 U | 11/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 112098443 A | 12/2020 |
| CN | 212084259 U | 12/2020 |
| CN | 212268703 U | 1/2021 |
| CN | 212314534 U | 1/2021 |
| CN | 212322247 U | 1/2021 |
| CN | 212364464 U | 1/2021 |
| CN | 306272538 S | 1/2021 |
| CN | 306283626 S | 1/2021 |
| CN | 112348761 A | 2/2021 |
| CN | 112348808 A | 2/2021 |
| CN | 112393880 A | 2/2021 |
| CN | 112395118 A | 2/2021 |
| CN | 212586854 U | 2/2021 |
| CN | 212597202 U | 2/2021 |
| CN | 306323627 S | 2/2021 |
| CN | 112433902 A | 3/2021 |
| CN | 112452935 A | 3/2021 |
| CN | 112455988 A | 3/2021 |
| CN | 112456100 A | 3/2021 |
| CN | 112565505 A | 3/2021 |
| CN | 212677296 U | 3/2021 |
| CN | 212681731 U | 3/2021 |
| CN | 111314537 B | 4/2021 |
| CN | 112613622 A | 4/2021 |
| CN | 112613914 A | 4/2021 |
| CN | 112614117 A | 4/2021 |
| CN | 112614269 A | 4/2021 |
| CN | 112633194 A | 4/2021 |
| CN | 112634245 A | 4/2021 |
| CN | 112634288 A | 4/2021 |
| CN | 112634301 A | 4/2021 |
| CN | 112672145 A | 4/2021 |
| CN | 112735081 A | 4/2021 |
| CN | 213001252 U | 4/2021 |
| CN | 213004872 U | 4/2021 |
| CN | 112777290 A | 5/2021 |
| CN | 112783702 A | 5/2021 |
| CN | 112816490 A | 5/2021 |
| CN | 112822740 A | 5/2021 |
| CN | 112828842 A | 5/2021 |
| CN | 112837076 A | 5/2021 |
| CN | 112837102 A | 5/2021 |
| CN | 213149008 U | 5/2021 |
| CN | 213301455 U | 5/2021 |
| CN | 213301535 U | 5/2021 |
| CN | 213305483 U | 5/2021 |
| CN | 112907182 A | 6/2021 |
| CN | 112991614 A | 6/2021 |
| CN | 113032198 A | 6/2021 |
| CN | 113034481 A | 6/2021 |
| CN | 113034493 A | 6/2021 |
| CN | 113034529 A | 6/2021 |
| CN | 113034530 A | 6/2021 |
| CN | 113034531 A | 6/2021 |
| CN | 113038012 A | 6/2021 |
| CN | 113052798 A | 6/2021 |
| CN | 113110806 A | 7/2021 |
| CN | 113114794 A | 7/2021 |
| CN | 113132523 A | 7/2021 |
| CN | 113160494 A | 7/2021 |
| CN | 113190215 A | 7/2021 |
| CN | 113191789 A | 7/2021 |
| CN | 213765490 U | 7/2021 |
| CN | 213796595 U | 7/2021 |
| CN | 213807304 U | 7/2021 |
| CN | 306700330 S | 7/2021 |
| CN | 113220647 A | 8/2021 |
| CN | 113220648 A | 8/2021 |
| CN | 113237473 A | 8/2021 |
| CN | 113238680 A | 8/2021 |
| CN | 113238905 A | 8/2021 |
| CN | 113252678 A | 8/2021 |
| CN | 113254292 A | 8/2021 |
| CN | 113254293 A | 8/2021 |
| CN | 113254294 A | 8/2021 |
| CN | 113268162 A | 8/2021 |
| CN | 113298078 A | 8/2021 |
| CN | 113301202 A | 8/2021 |
| CN | 113329222 A | 8/2021 |
| CN | 213917879 U | 8/2021 |
| CN | 213933659 U | 8/2021 |
| CN | 306744667 S | 8/2021 |
| CN | 306744668 S | 8/2021 |
| CN | 306786433 S | 8/2021 |
| CN | 306786434 S | 8/2021 |
| CN | 113422860 A | 9/2021 |
| CN | 214160736 U | 9/2021 |
| CN | 214162705 U | 9/2021 |
| CN | 214427985 U | 10/2021 |
| CN | 113591066 A | 11/2021 |
| CN | 113591963 A | 11/2021 |
| CN | 215246545 U | 12/2021 |
| CN | 215247165 U | 12/2021 |
| CN | 215247245 U | 12/2021 |
| CN | 215247426 U | 12/2021 |
| CN | 215262785 U | 12/2021 |
| CN | 215262787 U | 12/2021 |
| CN | 215266884 U | 12/2021 |
| CN | 215266954 U | 12/2021 |
| CN | 215325354 U | 12/2021 |
| CN | 215556081 U | 1/2022 |
| CN | 215575427 U | 1/2022 |
| CN | 215576764 U | 1/2022 |
| CN | 215576765 U | 1/2022 |

(56) References Cited

FOREIGN PATENT DOCUMENTS

| | | |
|---|---|---|
| CN | 215703219 U | 2/2022 |
| CN | 216612155 U | 5/2022 |
| CN | 112672145 B | 2/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | H11334851 | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 A | 3/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017040957 A | 2/2017 |
| JP | 2017093938 | 6/2017 |
| JP | 2019012474 | 1/2019 |
| JP | 3223233 U | 9/2019 |
| JP | 2022539909 A | 9/2022 |
| JP | 2022539910 A | 9/2022 |
| JP | 2022539912 A | 9/2022 |
| JP | 2022545336 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | 2005054877 | 6/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |

(56) References Cited

FOREIGN PATENT DOCUMENTS

| | | |
|---|---|---|
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | WO2022034298 | 2/2022 |
| WO | WO2022090999 | 5/2022 |
| WO | WO2022091000 | 5/2022 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-LCD-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Draft IDS 10/26ress Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Foster et al., "Automated Visual Inspection: a Tutorial" 1990 Computers Ind. Engng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recylcing," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

GSM Arena Glossary, "LCD (Liquid Crystal Display", retrieved from http://www.gsmarena.com/glossary.php3?term=LCD on Apr. 28, 2016, 1 page.

International Numbering Plan, www.numberingplans.com, 2 pages.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Kanter, James Max, "Color Crack:Identifying Cracks in Glass," dated Dec. 9, 2014; retrieved from the internet http://www.jmaxkanter.com/static/papers/color_crack.pdf on Sep. 22, 2017.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

MobileGazette.com, "2006 in Review: The Good, The Bad and The Ugly", published Dec. 2006, retrieved from http://www.mobilegazette.com/2006-review-06x12x22.htm on Nov. 11, 2015.

Oliveira, et al., "Automatic crack detection on road imagery using anisotropic diffusion and region linkage," 18th European Signal Processing Conference (EUSIPCO-2010), Aug. 23, 2010, pp. 274-278.

PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.

Perng et al., "A Novel Vision System for CRT Panel Auto-Inspection", Journal of the Chinese Institute of Industrial Engineers, vol. 24, No. 5, pp. 341-350 (2007).

Perng et al., "A Novel Vision System for CRT Panel Auto-Inspection", Proceedings of the 2005 IEEE International Conference on Mechatronics, Jul. 10-12, 2005, pp. 4.

Phifer, "How to Use your 3G Phone as a Wireless Broad Band Modem," Computer Weekly News, 2007, 6 pages.

Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.

Rehg et al. "Vision for a Smart Kiosk" IEEE, Computer Society Conference on Computer Vision and Pattern Recognition (1997).

RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.

Rolf Steinhilper "Remanufacturing: The Ultimate Form of Recycling", Fraunhofer IRBVerlag, 1998, parts 1-3, http://www.reman.org/Publications_main.htm.

Romano "Recycling a Phone at EcoATM is an Easy Route to Feeling Green," Xconomy, Jan. 22, 2014, pp. 1-3.

Rosebrock, "How to Build a Kick-Ass Mobile Document Scanner in Just 5 Minutes" PyImage Search, Sep. 2014, 19 pages.

Shotton et al., "Efficiently Combining Contour and Texture Cues for Object Recognition", Proceedings of the British Machine Vision Conference 2008, (Sep. 1, 2008), pp. 7.1-7.10 abstract.

Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.

SimplySellular, "Get Cash for your Old Cell Phone", published Apr. 2, 2010, retrieved from http://simplysellular.com/conditions.php on Jan. 6, 2015, 2 pages.

Sony Ericsson Mobile Communications AB, "P800/P802," White Paper, 2003, 128 p.

Sony Ericsson Mobile Communications AB, "T68i/T68ie," White Paper, 2002, 71 pages.

Tecace Software: "Your phone appraisal-Movaluate -Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.

Trading devices for dollars, The Economist (US) 405.8813:8 (US), Economist Intelligence Unit N.A. Incorporated, Dec. 1, 2012.

Turner, "5 MP3 Players for Pumping up Your Workouts, " Mashable.com, Nov. 4, 2010, available online at https://mashable.com/2010/11/04/mp3-players-for-sports/ (Year: 2010).

Waugh, "Phone recycling machine lets you drop in old mobiles—and spits out cash instantly," Daily Mail Online, Jan. 13, 2012, p. 1-2.

Wikipedia, "Machine Vision" Sep. 19, 2009, 6 pages.

Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.

Wu, "Overview of Wireless Power and Data Communication" WPC/QI Developers Forum, Oct. 29, 2016, 21 pages.

(56) References Cited

OTHER PUBLICATIONS

Yahoo Answers, "What is a Clean ESN?" published Jun. 23, 2009, retrieved from http://web.archive.org/web/20090623215042/http://answers.yahoo.com/question/inde,8020US?gid=20080318061012AANFRco on Apr. 3, 2014.

Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.

International Search Report and Written Opinion mailed Nov. 29, 2021 in International Application No. PCT/US2021/071192, 15 pages.

International Search Report and Written Opinion mailed Dec. 6, 2021 in International Application No. PCT/US2021/071191, 15 pages.

Invitation to Pay Additional Fees & Partial Search Report mailed Nov. 29, 2021 in International Application No. PCT/US2021/071200, 11 pages.

International Search Report and Written Opinion mailed Jan. 24, 2022 in International Application No. PCT/US2021/071200, 19 pages.

International Search Report and Written Opinion mailed Nov. 22, 2021 in International Application No. PCT/US2021/071201, 17 pages.

Wiley Encyclopedia of Computer Science and Technology (2009).

Tech Spurt, "Sandisk iXpand Review | Wireless Charger & Auto Photo Backup!" https://www.youtube.com/watch?v=zemKQ6xIJLww, Aug. 21, 2019, 1 page.

Non-Final Office Action mailed Apr. 18, 2023 in U.S. Appl. No. 17/445,158, 6 pages.

Restriction Requirement response filed Jun. 20, 2023 in U.S. Appl. No. 17/445,158, 14 pages.

Grose, Thomas; "New Life for Old Phones," ASE Prism 22.3 (2012): 18.

\* cited by examiner

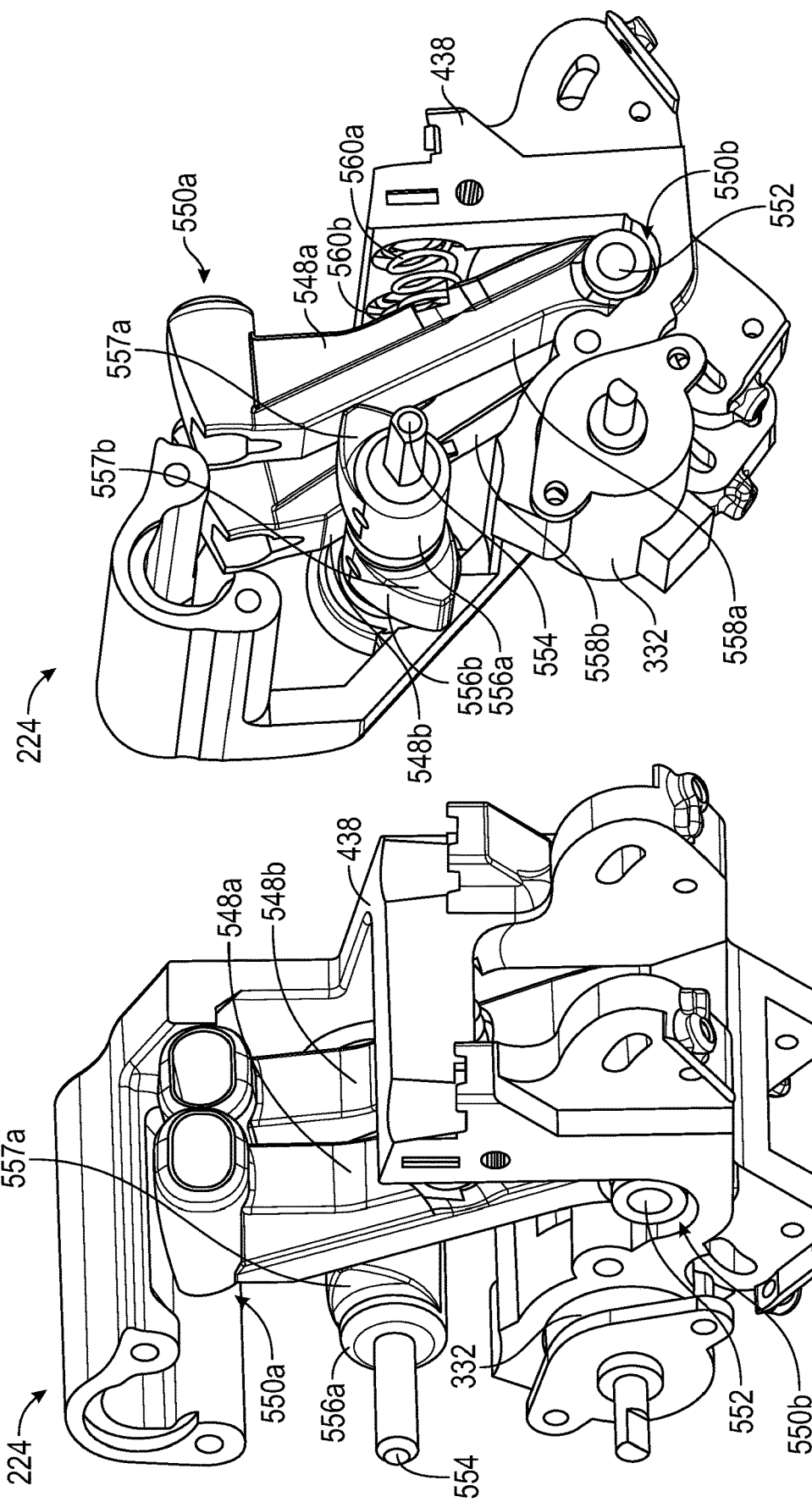

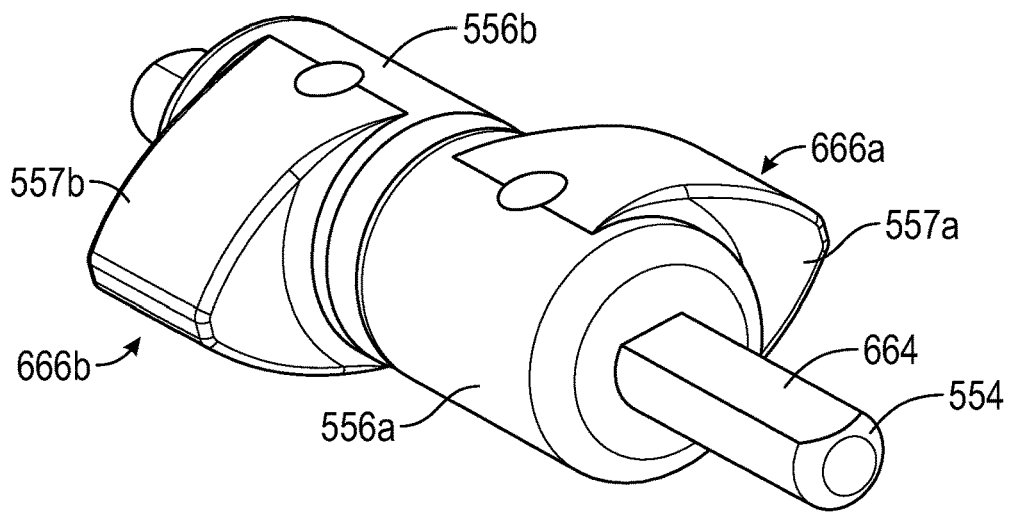
FIG. 6
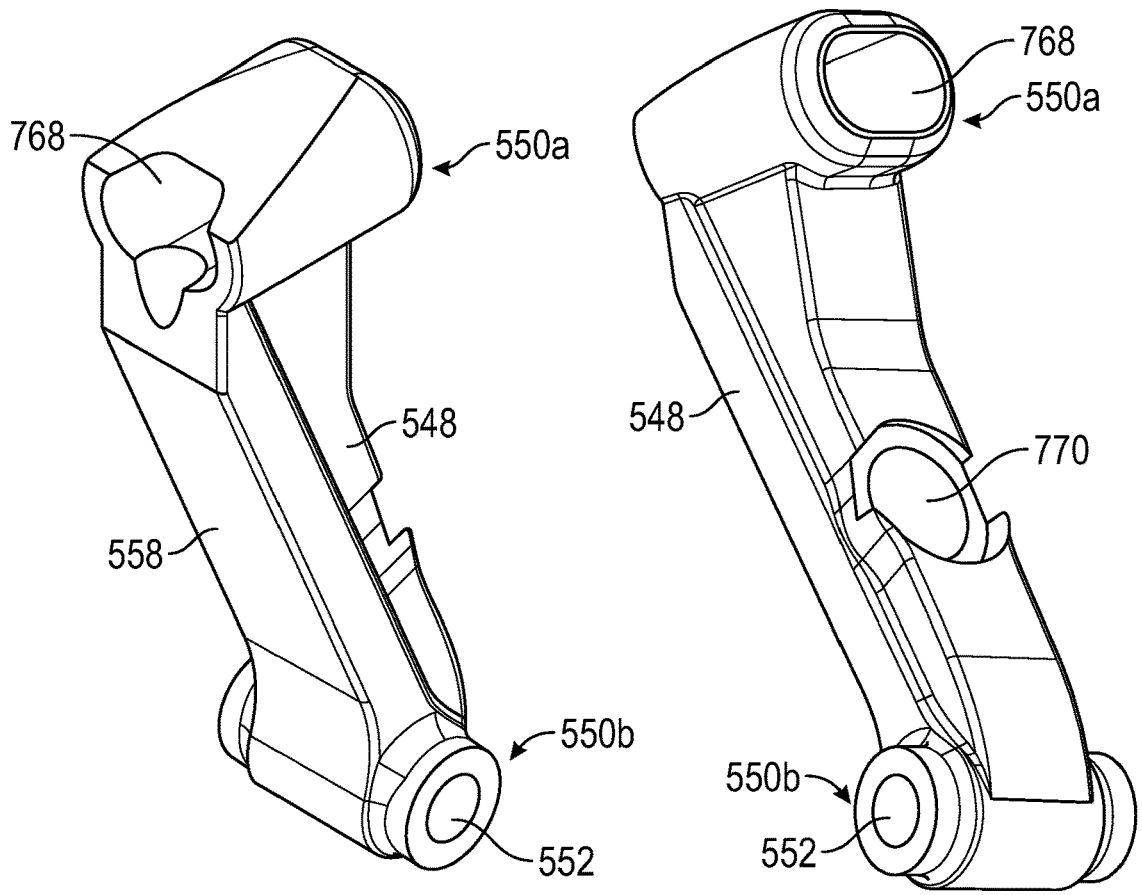
FIG. 7A
FIG. 7B

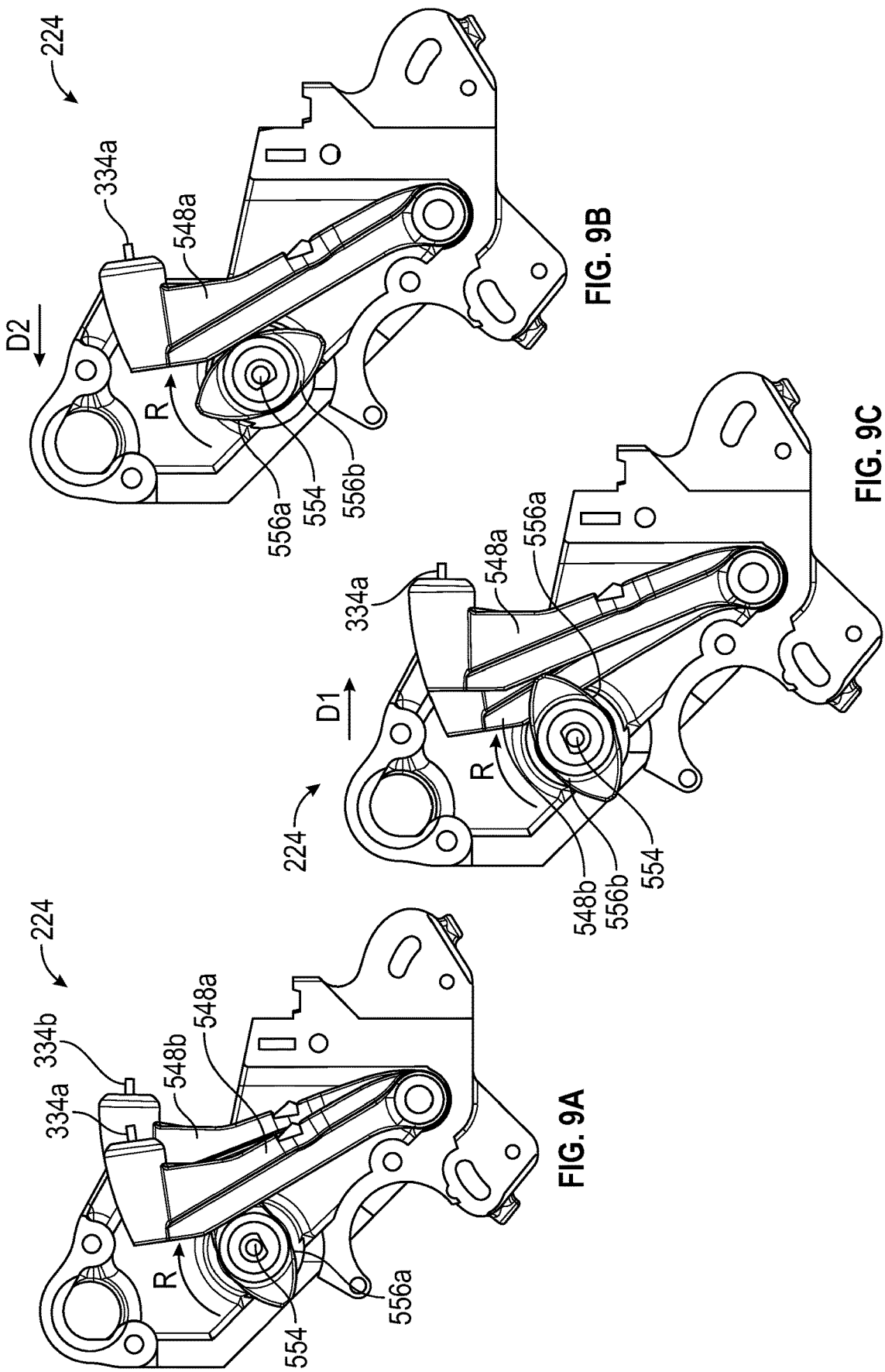

CONNECTOR CARRIER FOR ELECTRONIC DEVICE KIOSK

CROSS-REFERENCE TO RELATED APPLICATIONS

This application claims the benefit of U.S. Provisional Patent Application No. 63/066,794, filed Aug. 17, 2020, the entirety of which is incorporated by reference herein.

TECHNICAL FIELD

The present disclosure is generally related to consumer operated kiosks for purchasing mobile phones and other mobile electronic devices from users.

BACKGROUND

There are more mobile phones in use now than there are people on the planet. The rapid growth of mobile phones is due in part to the rapid pace at which they evolve. Because of the rapid pace of development, a relatively high percentage of mobile phones are replaced every year as consumers continually upgrade to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentially harmful consequences for humans and the environment.

As an alternative to retailer trade-in or buyback programs, consumers can recycle and/or sell their used mobile phones using self-service kiosks located in malls, retail stores, or other publicly accessible areas. Such kiosks are operated by ecoATM, LLC, the assignee of the present application, and can be configured to receive mobile phones from different manufactures and with different electrical connector configurations.

BRIEF DESCRIPTION OF THE DRAWINGS

FIGS. 5A and 5B are right rear and right front isometric views, respectively, of certain aspects the electrical connector carrier assembly of FIG. 4, with other aspects omitted for the purpose of clarity.

FIG. 6 is an isometric view of the camshaft and the cam lobes of FIGS. 5A-5C.

FIGS. 7A and 7B are right front and right rear isometric views, respectively, of the cam follower of FIGS. 5A-5C.

FIGS. 9A-9C are a series of side views illustrating operation of certain aspects the electrical connector carrier assembly of FIG. 4, with other aspects of the carrier assembly omitted for the purpose of clarity.

DETAILED DESCRIPTION

Figure 2A:
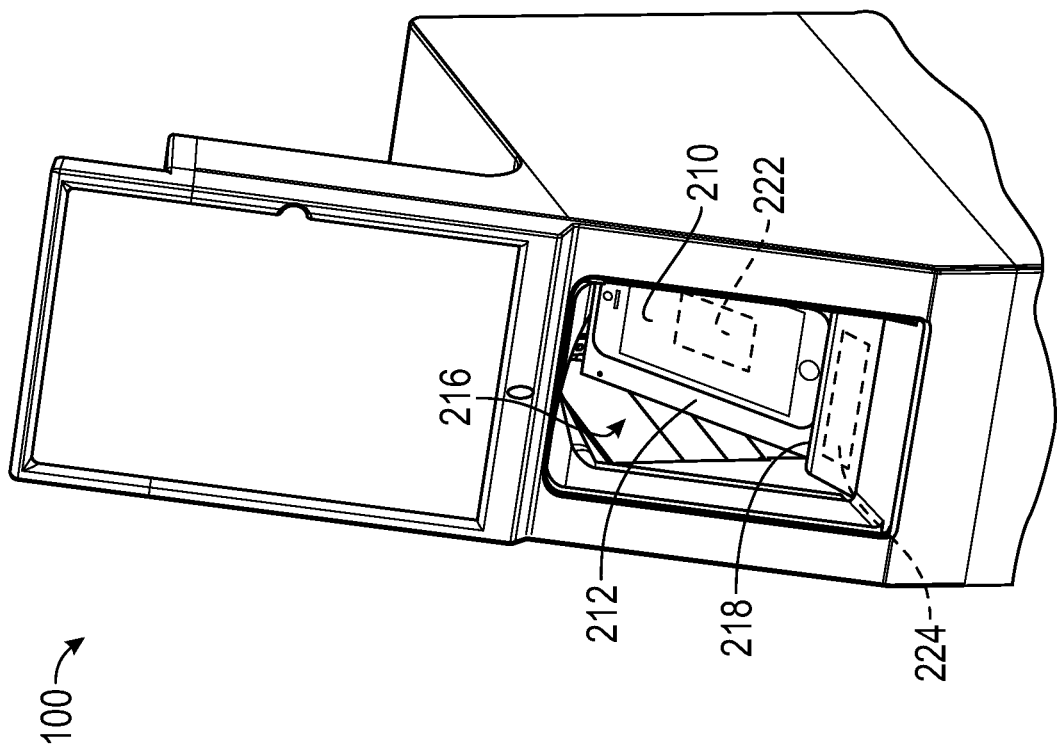
FIGS. 2A-2C are a series of enlarged isometric views illustrating structures and functions associated with an inspection area of the kiosk of FIG. 1, configured in accordance with embodiments of the present technology.

The following disclosure describes various embodiments of devices, systems, and associated methods for providing an appropriate electrical connector for connection to, e.g., a mobile phone or other electronic device in a consumer operated kiosk. As described in greater detail below, in some embodiments, the kiosk determines the appropriate connector for connecting to a mobile phone submitted by a user, and a connector carrier configured in accordance with the present technology automatically presents the appropriate connector in a position in which the user can easily connect their phone to the connector. When connected to the mobile phone, the electrical connector can be used to inspect and evaluate the mobile phone, e.g., for recycling. In some embodiments, connector carriers configured in accordance with the present technology can include a camshaft having one or more cam lobes positioned to act on one or more cam followers. Each of the cam followers can carry one of a plurality of different mobile phone connectors. In contrast to conventional connector carriers in which the connectors and the associated cables are manually extracted from the carrier for manual connection to a mobile device, kiosks including connector carriers configured in accordance with embodiments of the present technology can identify an appropriate electrical connector, identify a cam lobe and/or a cam follower associated with the appropriate electrical connector, and rotate a camshaft to drive the identified cam lobe into the corresponding cam follower to position the appropriate electrical connector for connection with the mobile device. After the electrical inspection, the kiosk can automatically disconnect the connector from the mobile device. As a result, the connectors and associated cables are not subjected to repeated pulling and other rough handling that can lead to premature wear and tear. Accordingly, use of connector carriers configured in accordance with the present technology can lead to longer connector/cable service life, reduced maintenance, and greater kiosk up-time.

Certain details are set forth in the following description and in FIGS. 1-9C to provide a thorough understanding of various embodiments of the present technology. In other instances, well-known structures, materials, operations and/or systems often associated with smartphones and other handheld mobile electronic devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
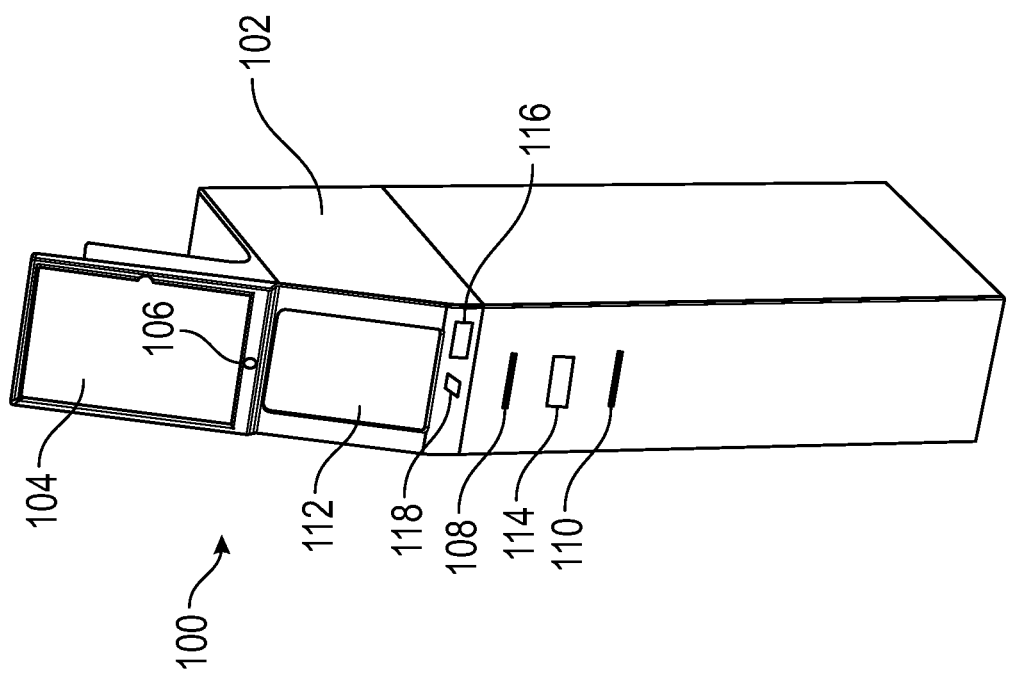
FIG. 1 is an isometric view of a consumer operated kiosk for purchasing mobile electronic devices from users, configured in accordance with embodiments of the present technology.

FIG. 1 is an isometric view of a consumer operated kiosk 100 for purchasing, recycling, or otherwise processing mobile phones and other electronic devices from users, configured in accordance with embodiments of the present technology. The kiosk 100 includes an enclosure or housing 102 that supports a display screen 104 positioned above an inspection area access door 112. The access door 112 can be formed from, e.g., one or more polymers (e.g., polyethylene, polycarbonate, etc.), glass, etc. that can be transparent, opaque or solid. The housing 102 can be manufactured from, for example, sheet metal, plastic panels, etc. in a conventional manner.

A plurality of user interface devices are provided on a front portion of the housing 102 for providing instructions and other information to users, and/or for receiving user inputs and other information from users. For example, in some embodiments, the display screen 104 can include a liquid crystal display (LCD) or a light emitting diode (LED) display screen, a projected display (such as a heads-up display or a head-mounted device), and so on, for providing information, prompts, etc. to users. The display screen 104 can also display graphical user interfaces (GUIs), including touch screens, for receiving user input and responses to displayed prompts. Additionally, or alternatively, the kiosk 100 can include a separate keyboard or keypad for receiving user inputs. The kiosk 100 can also include an ID reader or scanner 108 (e.g., a driver's license scanner), a fingerprint scanner 118, and one or more external cameras 106 (e.g., digital still and/or video cameras). The kiosk 100 can additionally include output devices such as a label printer (e.g., a barcode label printer) having an outlet 116, a payment (e.g., cash, voucher, coupon, etc.) dispenser having an outlet 110, and/or a receipt dispenser having an outlet 114. Although not identified in FIG. 1, the kiosk 100 can further include, e.g., a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and/or output devices. Additionally, the kiosk 100 can also include a barcode reader (for reading, e.g., a barcode displayed on a mobile device), a QR code reader (for reading, e.g., a QR displayed on a mobile device), a package or bag dispenser (e.g., a shipping package dispenser), a digital signature pad, etc. The user interface devices described above are representative of such devices that can be included with some embodiments the kiosk 100. Depending on the particular use case or commercial application, other embodiments of the kiosks disclosed herein can include other devices, or one or more of the above devices may be omitted. Accordingly, embodiments of the kiosk 100 are not limited to the type or arrangement of user interface devices described above.

Figure 2C:
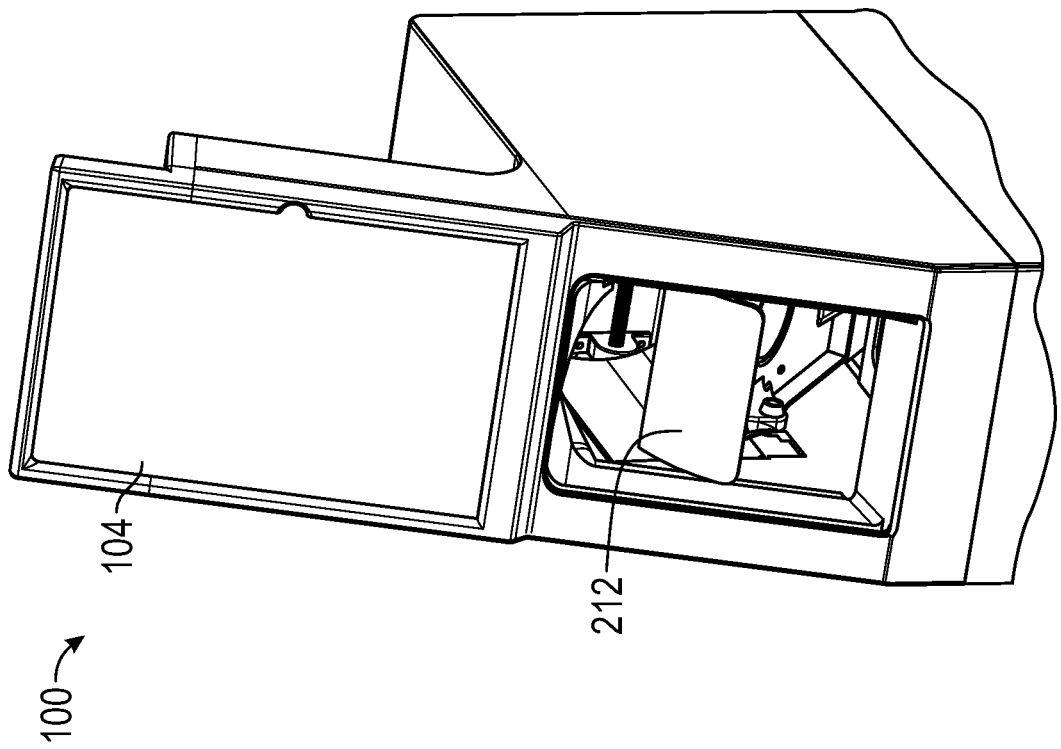
Figure 2B:
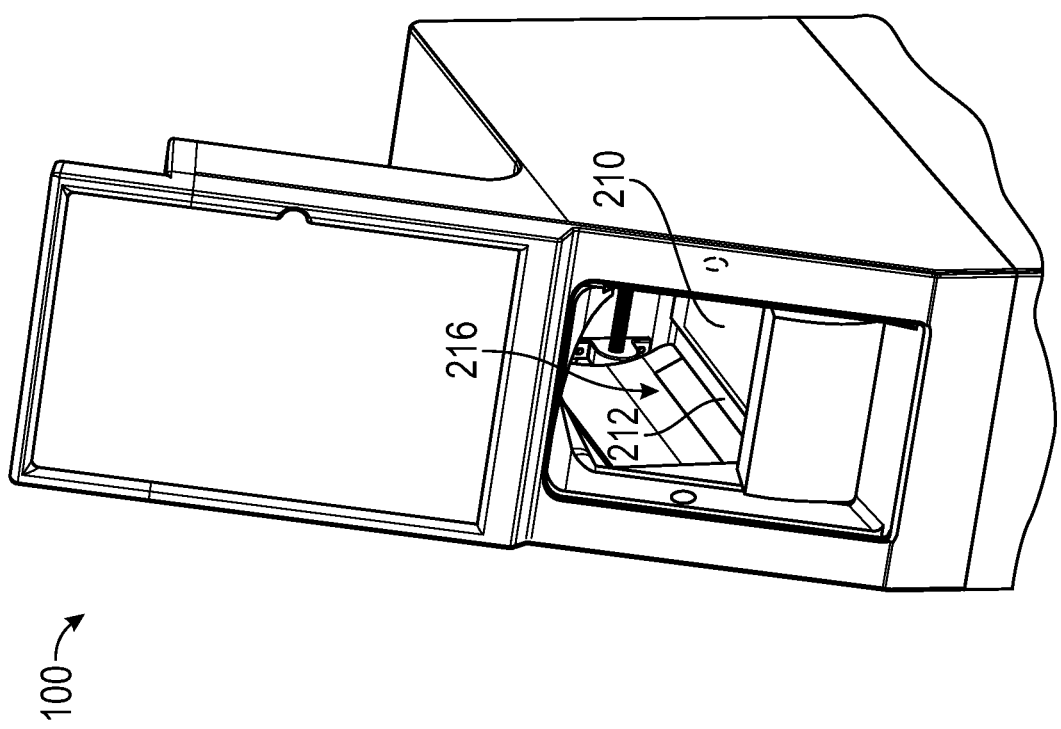

FIGS. 2A-2C are a series of enlarged isometric views illustrating structures and functions associated with an inspection area 216 of the kiosk 100. Referring first to FIG. 2A, in some embodiments, a user wishing to sell a used electronic device (e.g., a mobile phone 210) via the kiosk 100 would first approach the kiosk 100 and follow prompts displayed on the display screen 104. Such prompts, for example, may ask the user what type of phone they wish to sell, who the carrier is, etc. To begin the process, the access door 112 (FIG. 1) retracts upwardly behind the display screen 104 to expose the inspection area 216. The inspection area 216 includes an inspection tray 212 having a shelf 218. The user is instructed (via, e.g., prompts on the display screen 104) to position the mobile phone 210 in the inspection area on the shelf 218 as shown in FIG. 2A. The mobile phone 210 is positioned on the inspection tray 212 so that a display of the mobile phone 210 is facing outwardly toward the user with the electrical connector receptacle or port facing downwardly toward the shelf 218. In some embodiments the kiosk 100 includes an electrical connector carrier assembly 224 (shown schematically in FIG. 2A) that, as described in greater detail below, automatically extends an appropriate electrical connector (not shown) outwardly from the shelf 218. As described in greater detail below, by positioning the mobile phone 210 on the shelf 218 in this manner, the user can easily connect the mobile phone 210 to the electrical connector. The appropriate electrical connector can be determined by the kiosk 100 in response to, for example, user responses to questions regarding the type of phone presented on the display screen 104. After the user has properly positioned the mobile phone 210 on the inspection tray 212 and the phone is powered on, the user can interact with the touch screen of the mobile phone 210 in response to prompts displayed on the display screen 104. As described in greater detail below, these interactions can cause the mobile phone 210 to display information about the phone (e.g., model identification, serial number, etc.) that can be captured by a camera (not shown) in the inspection area 216 and used by the kiosk to facilitate the phone inspection process, provide a price quote, etc. For example, in some embodiments the kiosk 100 can prompt or instruct the user to dial "*#06#" on the mobile phone 210 (via, e.g., the display screen of the mobile phone 210), which can bring up information about the mobile phone 210, such as the IMEI number.

In some embodiments, the kiosk 100 can also include a wireless charger 222 positioned in relatively close proximity to the mobile phone 210 when the phone is positioned on the inspection tray as shown in FIG. 2A. For example, in the illustrated embodiment, the wireless charger 222 is mounted to the backside of the inspection tray 212. The wireless charger 222 can be, for example, a "Qi wireless charger" that functions in accordance with the Qi open interface standard that defines wireless power transfer using inductive charging over distances of up to, e.g., about 1.6 inches. In operation, the wireless charger 222 can provide a quick charge to the mobile phone 210 if it is placed on the inspection tray 212 without power. Additionally, in operation the wireless charger 222 receives certain information about the mobile phone (e.g., make, model, a unique 32-bit identifier associated with the phone, Qi standard, etc.) as part of the charging process. This information can be transmitted to the kiosk processor and used to, for example, identify the correct electrical connector (e.g., a USB-C or Lightning connector) to present to the user on the inspection tray shelf 218.

Turning next to FIG. 2B, the inspection tray 212 can be configured to rotate rearwardly into a horizontal position so that the mobile phone 210 is facing upwardly in the inspection area 216. Although, in some embodiments, the access door 112 (FIG. 1) would normally be closed during this stage of kiosk operation, the access door 112 is not shown in FIG. 2B (or FIG. 2C) to better illustrate operation of the inspection tray 212 and the inspection area 216. With the mobile phone 210 in this position (or in the prior position illustrated in FIG. 2A), the kiosk 100 performs an electrical inspection of the mobile phone 210 via the electrical connector to identify the phone and further evaluate the condition of the phone, as well as specific component and operating parameters such as memory, carrier, etc. For example, in some embodiments, the kiosk 100 (e.g., a kiosk CPU or other processing device) can query the mobile phone 210 (by using, e.g., an operating system API) to obtain characteristic information about the mobile phone 210, which can include device identification, make, model, configuration, and/or a unique identifier (e.g., an IMEI number, an MEID, and/or any other suitable unique identifier). In some embodiments, the characteristic information further includes device functionality, including hardware/software configuration, charging capability, memory capacity, etc. In some embodiments, the electrical analysis includes evaluating the condition and/or functionality of the charging circuit of the electronic device. In some embodiments, the kiosk 100 performs the electrical analysis using one or more of the methods and/or systems described in detail in the patents and patent applications identified herein and incorporated herein by reference in their entireties.

In addition to performing an electrical inspection, the kiosk 100 can also perform a visual inspection of the mobile phone 210 using one or more cameras (not shown) positioned in the inspection area 216. In some embodiments, the visual inspection includes a 3D visual analysis (of, e.g., the shape and/or size of the phone) to confirm the identification of the mobile phone 210 (e.g., make and model) and/or to evaluate or assess the condition and/or function of the mobile phone 210 and/or its various components and systems. The visual analysis can also include an inspection of the mobile phone 210 for cracks or other damage to the display screen (LCD), as well as cracks on other portions of the mobile phone. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as model number, serial number, IMEI number, etc. In some embodiments, the visual analysis includes one or more of the methods and/or systems described in detail in the patents and patent applications identified herein and incorporated herein by reference in their entireties.

After the mobile phone 210 has been fully evaluated and the kiosk 100 has determined a purchase price, the purchase price can be offered to the user via the display screen 104. If the user accepts the purchase price offer, the access door 112 remains closed and the inspection tray 212 rotates further rearwardly as shown in FIG. 2C, so that the mobile phone 210 can slide off of the inspection tray 212 and into a storage bin (not shown). (Although the access door 112 would normally be closed during this stage of operation, the access door 112 is omitted from FIG. 2C for purposes of illustrative clarity.) The kiosk 100 can then provide payment of the purchase price to the user. In some embodiments, payment can be made in the form of cash dispensed from the payment outlet 110. In other embodiments, the user can receive remuneration for the mobile phone 210 in various other useful ways. For example, the user can be paid via a redeemable cash voucher, a coupon, an e-certificate, a pre-paid card, etc. that is dispensed from the kiosk 100; or via a gift code, redeemable voucher, coupon, e-certificate, etc., that is sent to the user via email, text, or other form of electronic message. Additionally, in some embodiments the user can be paid via a wired or wireless monetary (e.g., cash) deposit to an electronic account (e.g., a bank account, credit account, loyalty account, online commerce account, mobile wallet, etc.) via, e.g., PayPal, Venmo, etc., or with cryptocurrency (e.g., Bitcoin), etc.

Alternatively, if the user declines the purchase price offer, or if the user's identity cannot be verified or the kiosk 100 otherwise determines that the transaction presents a fraud risk, the transaction can be declined and the mobile phone 210 returned to the user. More specifically, the inspection tray 212 rotates forwardly to the position illustrated in FIG. 2A and the access door 112 opens so that the user can retrieve the mobile phone 210 from the kiosk 100.

Figure 3:
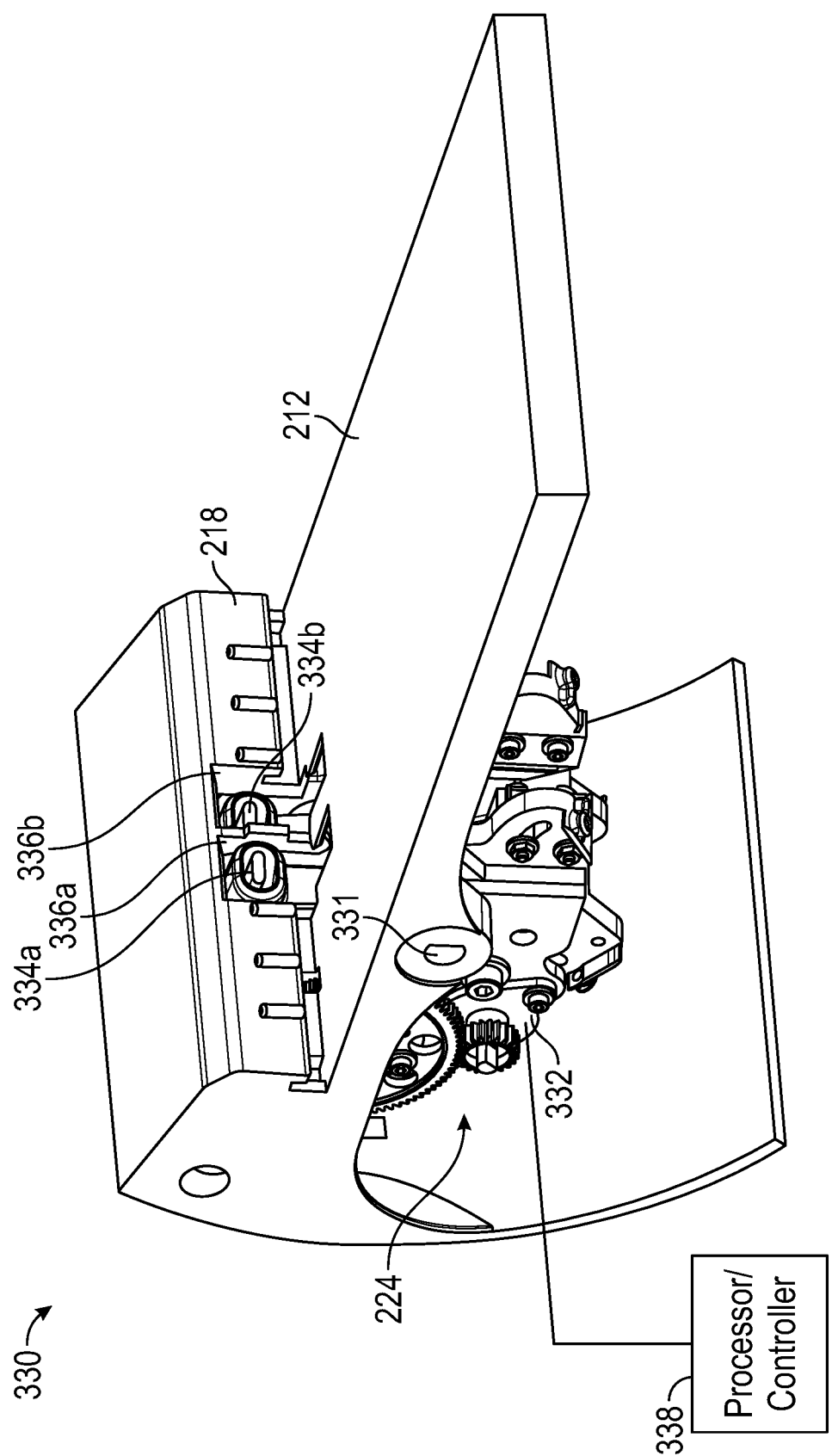
FIG. 3 is a right rear isometric view of an inspection tray assembly configured in accordance with embodiments of the present technology.

FIG. 3 is a right rear isometric view of an inspection tray assembly 330 configured in accordance with embodiments of the present technology. The inspection tray assembly 330 can include the inspection tray 212 and the electrical connector carrier assembly 224, which can alternatively be referred to as "the connector carrier assembly 224" and/or the "carrier assembly 224." In the illustrated embodiment, the carrier assembly 224 is mounted to the underside of the inspection tray 212 and moves with the inspection tray 212 as it pivots about, e.g., an inspection tray bore 331 and between the three positions illustrated in FIGS. 2A-2C. The connector carrier assembly 224 includes an electric motor 332 (e.g., a stepper motor) operably coupled to a camshaft (described below with respect to FIGS. 5A-5C). The camshaft includes one or more cam lobes that are each operably positioned to move a corresponding one of a plurality of mobile device electrical connectors 334a-b (e.g., USB connectors, Android and iOS connectors, etc.). Each of the electrical connectors can be positioned in or near a corresponding opening 336a-b in the shelf 218 of the inspection tray 212. In the illustrated embodiment, for example, the inspection tray assembly 330 includes a first opening 336a aligned with a first electrical connector 334a and a second opening 336b aligned with a second electrical connector 334b. In operation, a kiosk processor and/or controller 338 can activate the motor 332, which in turn can rotate the camshaft so that one of the lobes selectively drives the desired electrical connector (e.g., first electrical connector 334a) outwardly through the corresponding opening 336a, while the other electrical connector(s) (e.g., second electrical connector 334b) remain retracted in the corresponding opening(s) (e.g., second opening 336b). With the desired electrical connector in this position, the user can easily connect their mobile phone to the correct connector when placing their mobile phone on the shelf 218, as illustrated above with reference to FIG. 2A.

With continued reference to FIG. 3, the camshaft configuration of the carrier assembly 224 enables the electrical connectors 334a-b to be compactly arranged in the inspection tray assembly 330. In some embodiments, the correct/appropriate electrical connector is selected based on the make and model of phone that the user has identified, e.g., via the display screen 104 (FIG. 1) that they wish to sell. Once the mobile phone has been electrically inspected via the selected connector, the motor 332 can rotate the camshaft to drive the selected connector to return back through the opening to automatically disconnect the connector from the mobile phone.

Figure 4:
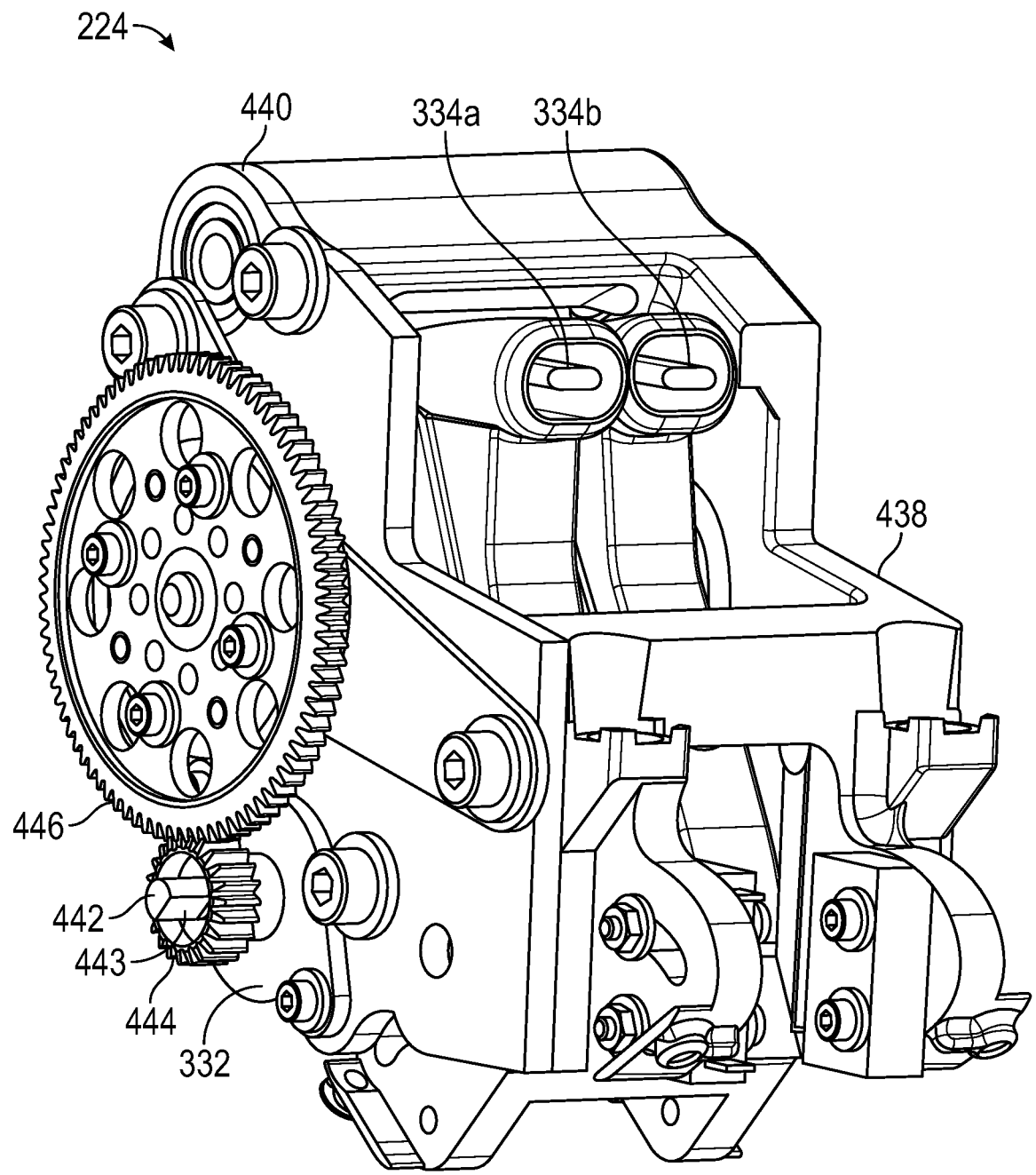
FIG. 4 is a right rear isometric view of an electrical connector carrier assembly configured in accordance with embodiments of the present technology.

FIG. 4 is a right rear isometric view of the electrical connector carrier assembly 224, configured in accordance with embodiments of the present technology. The carrier assembly 224 can include a housing or support structure 438 having a plate or plate portion 440. In some embodiments, the support structure 438 is connected to the inspection tray 212 and moves therewith during operation of the kiosk 100. The motor 332 can be coupled or otherwise secured to the housing 438, and can include a motor or output shaft 442 operably coupled to a first gear 444. In the illustrated embodiment, for example, the motor shaft 442 is keyed and/or includes a flat or engagement surface 443 that engages the first gear 444, e.g., to drive rotation thereof. The carrier assembly 224 can further include a second gear 446 operably coupled to the camshaft (not shown). In the illustrated embodiment, the first gear 444 is a spur gear and/or a drive gear and the second gear 446 is a spur gear and/or a driven gear such that, in operation, the motor 332 can rotate the first gear 444 to drive rotation of the second gear 446, e.g., to rotate the camshaft and selectively drive the desired electrical connector 334a-b outwardly, as described previously and with reference to FIG. 3.

FIGS. 5A and 5B are right rear and right front isometric views, respectively, of certain aspects the electrical connector carrier assembly 224 of FIG. 4, with other aspects omitted for the purpose of clarity. The carrier assembly 224 can include one or more cam followers movably coupled to the housing 438. In the illustrated embodiment, for example, the carrier assembly 224 includes a first cam follower 548a and a second cam follower 548b ("the cam followers 548"). Each of the cam followers 548 can have a first or distal end portion 550a and a second or proximal end portion 550b opposite the first end portion. In FIGS. 5A and 5B, the first and second end portions 550a-b are only shown for the first cam follower 548a for the purpose of clarity; however, it can be appreciated that the second cam follower 548b can be configured generally similar to or the same as the first cam follower 548a (e.g., to also include first and second end portions). In the illustrated embodiment, the second end portion 550b is pivotably or rotatably coupled to the housing 438 via, e.g., a pivot shaft (not shown) received by a bore 552, such that first end portion 550a can pivot or rotate about the second end portion 550b. The first end portion 550a can include the electrical connector (illustrated and described below with respect to FIGS. 8A-9C).

The carrier assembly 224 can include a camshaft 554 having one or more cam lobes. Each of the cam lobes can be positioned to contact, drive, and/or otherwise correspond to one of the cam followers 548. In the illustrated embodiment, for example, the camshaft 554 includes a first cam lobe 556a that corresponds to the first cam follower 548a and a second cam lobe 556b that corresponds to the second cam follower 548b ("the cam lobes 556"). Each of the cam lobes 556 can include a protrusion 557a-b or other rotationally asymmetric feature extending away from the camshaft 554. The camshaft 554 can be operably (e.g., rotatably, etc.) coupled to the housing 438 such that, as described previously, the motor 332 can drive rotation of the camshaft 554, e.g., about a longitudinal axis of the camshaft 554 (not shown). The rotation of the camshaft 554 can cause one or more of the cam lobes 556 to exert force onto one of the cam followers (e.g., via rotation of the protrusions 557 into contact with the cam followers). In the illustrated embodiment, for example, rotation of the cam shaft selectively causes the first cam lobe 556a to exert a force onto a first bearing surface 558a of the first cam follower 548a and causes the second cam lobe 556b to exert a force onto a second bearing surface 558b of the second cam follower 548b. As described in greater detail below, the interaction between the cam lobe(s) 556 and the bearing surface(s) 558 can move (e.g., pivot, translate, etc.) the cam follower(s) 548 relative to the housing 438, e.g., to drive the desired electrical connector to a position in which a user can easily connect their mobile phone to the electrical connector.

As illustrated in FIG. 5B. the carrier assembly 224 can include one or more biasing elements 560 operably coupled to the housing 438 and positioned to act against the cam followers 548. In the illustrated embodiment, for example, the carrier assembly 224 includes a first biasing element 560a positioned to act against the first cam follower 548a and a second biasing element 560b positioned to act against the second cam follower 548b. In the illustrated embodiment, the biasing element(s) 560 can be configured to bias the cam follower(s) 548 inwardly, e.g., to and/or toward from the camshaft 554 and away from the extended position in which the electrical connector can be connected to the mobile phone. In such embodiments, the biasing element(s) 560 can be configured to automatically disconnect the electrical connector from the mobile phone. The biasing element(s) 560 can include one or more compression springs, tension springs, torsion springs, and/or any other suitable biasing element. The biasing element(s) 560 can have sufficient tension and/or spring constant to ensure that the biasing force provided by the biasing element(s) 560 fully disconnects the electrical connector from the mobile phone. It can be appreciated that, in other embodiments, the carrier assembly 224 can be configured to operate at least partially in reverse, e.g., such that one or more of the biasing element(s) 560 can be configured to bias the cam follower(s) 548 outwardly, e.g., to and/or toward the extended position in which the electrical connector can be connected to the mobile phone and the camshaft 554 and cam lobe(s) 556 can be configured to drive the cam follower(s) 548 inwardly, e.g., away from the extended position.

With continued reference to FIGS. 5A and 5B, in some embodiments the carrier assembly 224 can include one or more sensors or sensing elements (not shown) operably coupled to one or more elements of the carrier assembly 224. Each of the one or more sensing elements can be operably coupled to and/or positioned to sense or determine the position and/or orientation of the cam followers 548. In at least some embodiments, for example, the carrier assembly 224 includes a first sensing element positioned to sense the position of the first cam follower 548a and a second sensing element positioned to sense the position of the second cam follower 548a. Additionally, or alternatively, the carrier assembly 224 can include a third sensing element configured to sense the rotational position and/or orientation of the camshaft 554 and/or the cam lobes 556. Each of the sensing elements can be communicatively coupled to the processor 338, such that, based at least in part on readings from the sensing elements, the processor 338 can determine an amount or angle to rotate the camshaft 554, e.g., to extend the appropriate electrical connector. For example, the motor 332 can be a stepper motor, and the processor 338 can determine a number of steps to rotate the stepper motor to position the appropriate electrical connector for connecting to the mobile phone 210. The sensing elements can include one or more switches, one or more pressure sensors, one or more optical sensors, one or more inductive sensors, one or more capacitive sensors, one or more rotation sensors, and/or any other suitable sensors and/or sensing elements. In some embodiments, the sensing elements are integrated switches configured to detect when the cam followers 548 are in extended positions (e.g., when the cables connectors are deployed). For example, the switches may be pressed when the cam followers 548 are in the deployed position.

Figure 5C:
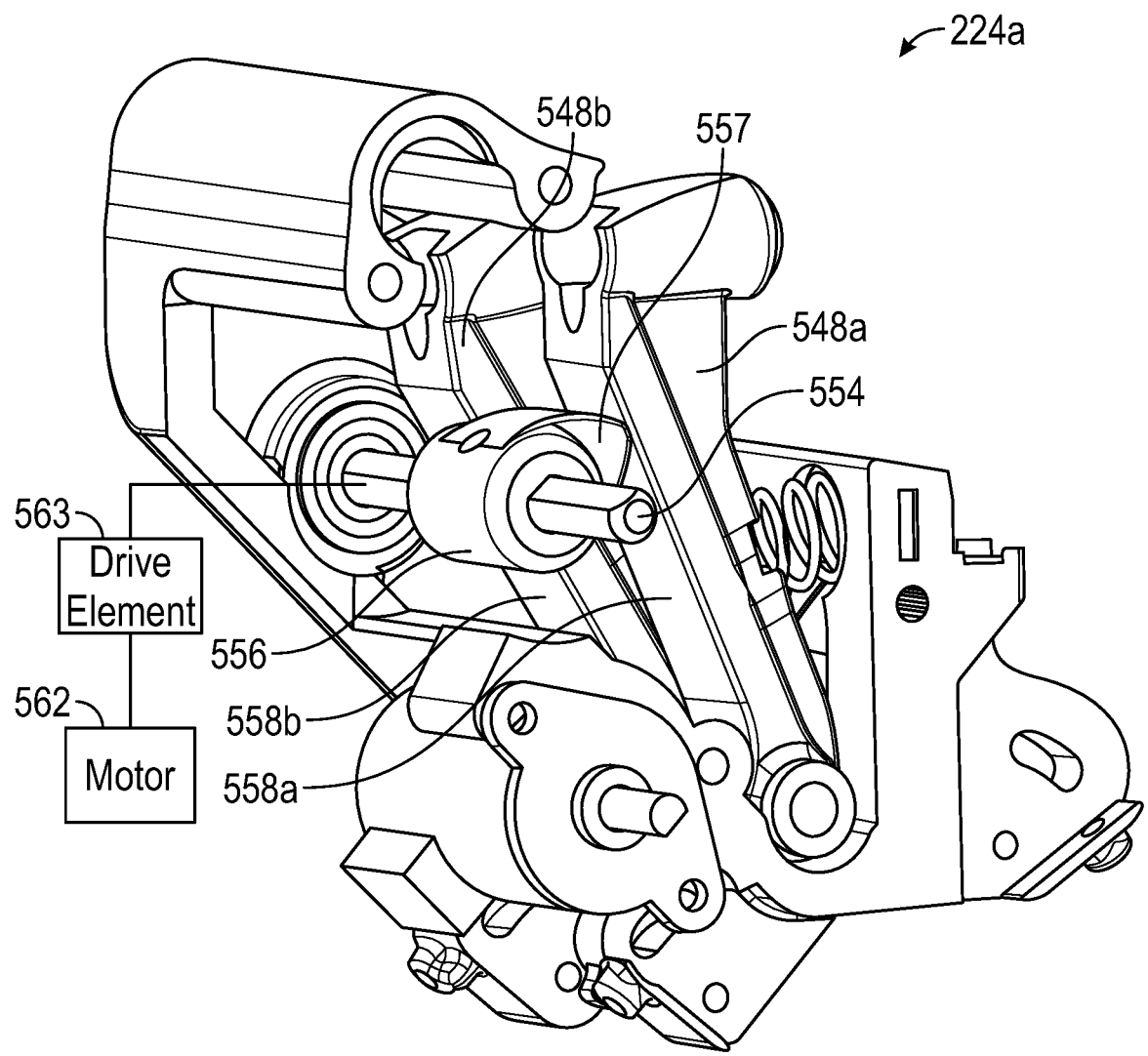
FIG. 5C is a right front isometric view of another electrical connector carrier assembly configured in accordance with embodiments of the present technology.

FIG. 5C is a right front isometric view of an electrical connector carrier assembly 224a generally similar to or the same as the carrier assembly 224 of FIG. 4. However, in the illustrated embodiment, the carrier assembly 224a includes a single cam lobe 556a and a plurality of cam followers 548a-b. The camshaft 554 and/or the cam lobe 556 can be operably coupled to a motor 562 (shown schematically) using, e.g., one or more threads, gears, drive screws, and/or any other suitable mechanisms or techniques. The motor 562 can be operable to move or translate the cam lobe 556 and/or the camshaft 554, e.g., axially along the longitudinal axis of the camshaft 554 and between one or more positions. For example, in the illustrated embodiment, the motor 562 can be configured to move the cam lobe 556 and the camshaft 554 between a first position in which the cam lobe 556 is positioned to contact the first cam follower 548a, and a second position (not shown) where the cam lobe 556 is positioned to contact the second cam follower 548b. The carrier assembly 224a can be configured to at least partially prevent movement of one or more of the cam followers 548 toward the camshaft 554, e.g., to allow the camshaft 554 and/or the cam lobe 556 to move or translate between the one or more positions without or substantially without interference from the cam followers 548. For example, in some embodiments one or more portions of the camshaft 554 proximate the cam lobe 556 can have an increased diameter (not shown), e.g., generally similar to or the same as a minimum diameter of the cam lobe 556. Additionally, or alternatively, in some embodiments the carrier assembly 224 can include one or more barriers or stops (not shown) positioned to contact the cam followers 548, e.g., to prevent movement thereof beyond a predetermined position (e.g., a position in which the cam lobe 556 can slide behind the cam followers 548). Additionally, or alternatively, in some embodiments the bearing surfaces 558, the cam lobe 556, and/or the camshaft 554 can include one or more sloped, ramped, and/or curved surfaces (not shown), such that the cam lobe 556 and/or the camshaft 554 can slidably engage the bearing surfaces 558, e.g., to move or translate between the one or more positions.

The camshaft 554 can be movably coupled to the motor 562 by one or more drive elements 563 (shown schematically in FIG. 5C). The drive elements 563 can include threading, one or more gears, one or more pneumatic drivers, one or more hydraulic drive elements, one or more solenoids, one or more electromechanical drive elements, one or more magnetic drive elements, and/or any other suitable drive elements. The camshaft 554 can be configured to include the drive elements 563, e.g., to drive translational movement thereof via the motor 562. Accordingly, by moving the camshaft 554 and/or the cam lobe 556, the electrical connector carrier assembly 224a can use a single cam lobe 556 to select and drive one or more cam followers 548.

FIG. 6 is an isometric view of the camshaft 554 and the cam lobes 556 of FIGS. 5A-5B. The camshaft 554 can be keyed, can include an engagement surface or flat 664, or can otherwise be shaped to engage the cam lobes 556, e.g., so that the cam lobes 556 can rotate in concert with the camshaft 554. As described above, each of the cam lobes 556 can include a protrusion 557 or other structure extending away from the camshaft 554. The protrusions 557 can include a contact portion 666. In the illustrated embodiment, for example, the first cam lobe 556a has a first contact portion 666a and the second cam lobe 556b has a second contact portion 666b. In the illustrated embodiment, the first and second contact portions 666a-b extend in opposite directions such that the first and second cam lobes 556a-b are diametrically opposed. In other embodiments, the first and second cam lobes 556a-b can have any other suitable orientation, e.g., the first cam lobe 556a can be angled, aligned, etc., relative to the second cam lobe 556b.

The camshaft 554 and cam lobes 556 can be formed from one or more polymers, metals (e.g., aluminum, titanium, stainless steel, etc.), composites, and/or any other suitable material.

Although the camshaft 554 is depicted as having two cam lobes 556a-b in FIG. 6, in other embodiments the camshaft 554 can have more or fewer cam lobes. In at least some embodiments, for example, the camshaft 554 can include between one and nine cam lobes 556, such as at least one, two, three, four, five, six seven, eight, or any other suitable number of cam lobes 556. In some embodiments, the relative orientations of each of the cam lobes 556 can correspond to the number of cam lobes 556, e.g., such that each of the cam lobes 556 can have a same angle or angular orientation relative to adjacent cam lobes as the other cam lobes.

FIGS. 7A and 7B are right front and right rear isometric views, respectively, of the cam follower 548 of FIGS. 5A-5C. The first end portion 550a of the cam follower 548 can include a connector aperture or holder 768 configured to receive or hold at least a portion the electrical connector 334 (not shown). In some embodiments, the connector holder 768 can receive a shell or casing (not shown) that at least partially encapsulates or surrounds the electrical connector 334, e.g., such that the electrical connector 334 fits firmly and securely within the connector holder 768. In other embodiments, the electrical connector 334 (and/or a cord or power cable portion of the electrical connector 334) can be coupled to the cam follower 548 and/or the connector aperture 768 via, e.g., mechanical fasteners, adhesives, and/or any other suitable coupling process or technique. The cam follower 548 can further include a recess or biasing element mount 770 configured to receive an end or other portion of the biasing element 560. In the illustrated embodiment, the recess 770 is positioned between the first and second end portions 550a-b and opposite the bearing surface 558. In other embodiments, the recess 770 can have any other suitable position on the cam follower 548. In at least some embodiments, for example, the bearing surface 558 can include the recess 770. Additionally, or alternatively, in some embodiments the cam follower 548 can include a plurality of recesses 770. Additionally, or alternatively, in some embodiments the bore 552 can be positioned between the first and second end portions 550a-b, e.g., such that both the first and second end portions 550a-b rotate about the bore 552.

Although FIGS. 7A and 7B illustrate a cam follower 548 configured to pivot, e.g., about the second end portion 550b, it is further contemplated that in some embodiments the cam follower 548 can be configured to move or translate linearly, e.g., generally or substantially along an axis (e.g., a longitudinal axis) defined by the first and second end portions 550a-b. In such embodiments, the cam follower 548 can be referred to as a linear cam follower, the electrical connector carried by the linear cam follower can be at least partially aligned with the linear cam follower longitudinal axis, the cam lobe 556 can be positioned to act against the second end portion 550b, and the biasing element 560 can be positioned to act against the first end portion 550a. The cam follower 548 can be formed from one or more polymers, metals (e.g., aluminum, titanium, stainless steel, etc.), composites, and/or any other suitable material.

Figure 8B:
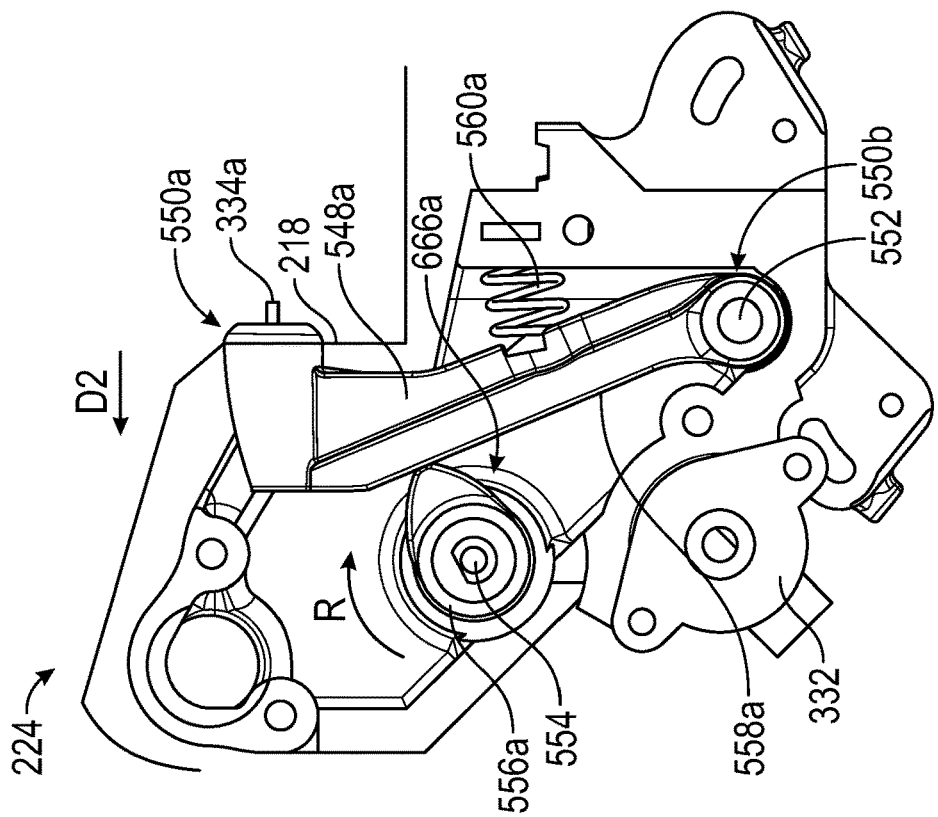
FIGS. 8A and 8B are side views illustrating operation of certain aspects the electrical connector carrier assembly of FIG. 4, with other aspects of the carrier assembly omitted for the purpose of clarity.
Figure 8A:
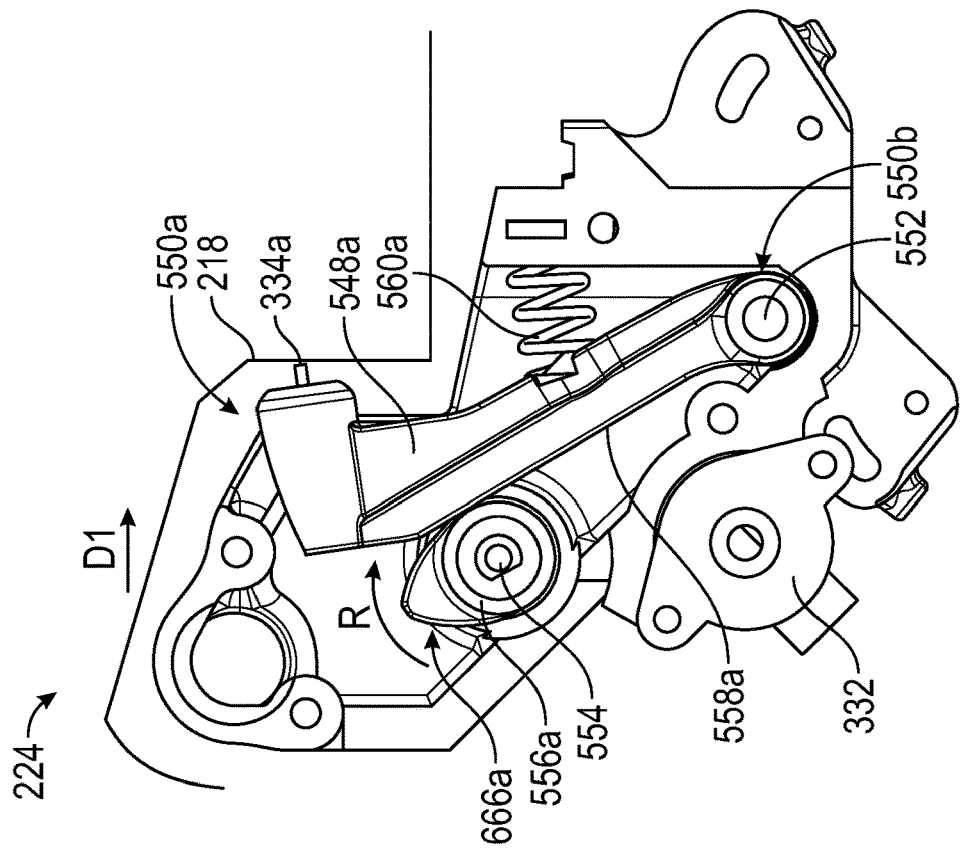

FIGS. 8A and 8B are side views illustrating operation of certain aspects the electrical connector carrier assembly 224 of FIG. 4, with other aspects of the carrier assembly 224 omitted for the purpose of clarity. Although described in the context of the first cam follower 548a and the first cam lobe 556a, it can be appreciated that a description of FIGS. 8A and 8B applies equally to the second cam follower 548b and the second cam lobe 556b, as well as any additional cam followers and/or cam lobes included in the carrier assembly 224.

As described previously, the motor 332 can be operably coupled to the camshaft 554, e.g., to drive rotation thereof. In the illustrated embodiment, the motor 332 is configured to drive rotation of the camshaft 554 in a clockwise direction R. In other embodiments, the motor 332 can be configured to drive rotation of the camshaft 554 in a counterclockwise direction, e.g., opposite the direction R. As the camshaft 554 rotates, the first cam lobe 556a rotates along with the camshaft 554, e.g., from the first position of FIG. 8A to and/or toward the second position shown in FIG. 8B. The rotation of the first cam lobe 556a can bring the first contact portion 666a into contact with the first bearing surface 558a. The contact between the first contact portion 666a and the first bearing surface 558a can rotate the first end portion 550a about the second end portion 550b to move the first end portion 550a outwardly, e.g., in the direction indicated by arrow D1.

When rotating the first cam follower 548a, the motor 332 can act against the first biasing element 560a. In the illustrated embodiment, for example, the first biasing element 560a is compressed as the first cam follower 548a pivots between the first position (FIG. 8A) and the second position (FIG. 8B). Referring to FIG. 8B, in the second position, the first end portion 550a of the first cam follower 548a can extend at least partially beyond the shelf 218, e.g., to position the first electrical connector 334a for connection to the mobile phone 210, as described previously. Additionally, it can be appreciated that further rotation of the camshaft 554, e.g., further clockwise rotation from the second position of FIG. 8B, can cause the first cam follower 548a to return from the second position to the first position. For example, further rotation of the camshaft 554 can drive the first contact portion 666a away from and/or out of contact with the first bearing surface 558a and allow the first biasing element 560a to act against the first cam follower 548a, pivoting the first end portion 550a about the second end portion 550b and moving the first end portion 550a in the direction D2. In some embodiments, the motion of the first end portion 550a in response to the first biasing element 560a can automatically disconnect the first electrical connector 334a from the mobile phone 210.

As described previously, in some embodiments the carrier assembly 224 includes one or more sensing elements configured to sense the position of the cam followers 548. Referring again to FIGS. 8A and 8B together, in some embodiments the carrier assembly 224 includes a first sensing element configured to sense whether the first cam follower 548a is in the first position (FIG. 8A) or the second position (FIG. 8B). For example, when in the second position, the first cam follower 548a can contact, press, or be otherwise detected by the first sensing element. Based on reading(s) from the sensing element(s), the kiosk 100 (e.g., the processor 338) can determine an operational status of the carrier assembly 224. For example, if the processor 338 sends a signal to the motor 332 to retract the first cam follower 548a (e.g., move from the second position to the first position) but a first reading from the first sensing element indicates that the first cam follower 548a is still in the second (extended or unretracted) position (e.g., if the first reading does not change in response to the signal to the motor 332), the processor 338 can determine, e.g., that first cam follower 548a is stuck in the second position, that the first biasing element 560a has not returned the first cam follower 548a to the first position, and/or that the first electrical connector 334a is still connected to the mobile phone 210.

In some embodiments, the carrier assembly 224 includes a second sensing element configured to sense a rotational position of the camshaft 554. As can be appreciated, because the rotation of the camshaft 554 can drive the first cam follower 548a between the first and second positions, the rotational position of the camshaft 554 can indicate whether the first cam follower 548a is in the first position or the second position. Accordingly, the above description of the first reading and first sensing element applies equally to a second reading from the second sensing element.

In some embodiments the carrier assembly includes a third sensing element configured to sense whether the electrical connector (e.g., the first electrical connector 334a) is connected to the mobile phone 210. The third sensing element can be operably coupled to the electrical connector, a cable or power cord of the electrical connector, and/or any other suitable element of the carrier assembly 224. Accordingly, the above description of the first reading and the first sensing element applies equally to a third reading from the third sensing element. In some embodiments, the processor 338 compares the first and/or second readings from the respective first and second sensing elements with the third reading from the third sensing element, e.g., to determine whether the electrical connector is connected to the mobile phone 210, etc.

FIGS. 9A-9C are a series of side views illustrating operation of certain aspects the electrical connector carrier assembly 224 of FIG. 4, with other aspects of the carrier assembly 224 omitted for the purpose of clarity. The discussion of FIGS. 8A and 8B applies equally to FIGS. 9A-9C. However, in the illustrated embodiment, the carrier assembly 224 includes two cam lobes (e.g., the first and second cam lobes 556a-b) and two cam followers (e.g., the first and second cam followers 548a-b). In FIGS. 9A-9C, the first and second cam lobes 556a-b are diametrically opposed, such that rotation of the camshaft 554 moves the first cam follower 548a or the second cam follower 548b, e.g., so only one of the cam followers 548a-b can be positioned to connect to the mobile phone 210 (not shown) at any given time. For example, in the first configuration illustrated in FIG. 9A, the second cam follower 548b is in an extended or connecting position where the second electrical connector 334b is positioned to connect to the mobile phone 210, and the first cam follower 548a is in a retracted position where the first electrical connector 334a is not positioned to connect to the mobile phone 210. Referring next to FIG. 9B, further rotation of the camshaft 554 (e.g., in the clockwise direction R) can allow the second cam follower 548b to rotate inwardly, in the direction indicated by the arrow D2, to a second configuration where neither cam follower 548a-b is extended and neither electrical connector 334a-b is positioned to connect to the mobile phone 210. Referring next to FIG. 9C, further rotation of the camshaft 554 can allow the first cam follower 548a to rotate outwardly, in the direction indicated by the arrow D1, to a third configuration where the first electrical connector 334a is positioned to connect to the mobile phone 210.

Referring to FIGS. 9A-9C together, it can be appreciated that rotation of the camshaft 554 can selectively and/or alternatively cycle the cam followers 548a-b and the corresponding electrical connectors 334a-b between extended and retracted positions. Accordingly, and as described previously, the carrier assembly 224 can rotate the camshaft 554 to extend the cam follower and the electrical connector that corresponds to a mobile phone's electrical connector receptacle, based at least in part on information received from the mobile phone 210 regarding a configuration of the mobile phone's electrical connector receptacle.

As those of ordinary skill in the art will appreciate, the foregoing processes are but some examples of ways in which the kiosk 100 can be used to purchase, recycle or otherwise process consumer electronic devices such as mobile phones. Additionally, it should be understood that the configuration of the kiosk 100 described above is but one example of a suitable mobile device evaluation, purchasing, and/or recycling system that can be used with embodiments of the present technology. Accordingly, other embodiments of the present technology can use other systems without departing from the present disclosure. Although the foregoing examples are described in the context of mobile phones, it should be understood that kiosk 100 and various embodiments thereof can also be used in a similar manner for recycling virtually any consumer electronic device, such as MP3 players, tablet computers, laptop computers, e-readers, PDAs, Google® Glass™ smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the kiosk 100 in various embodiments thereof can similarly be used by others, such as store clerk, to assist consumers in recycling, selling, exchanging, etc. their electronic devices.

The following patents and patent applications are incorporated herein by reference in their entireties: U.S. Pat. Nos. 10,860,990; 10,853,873; 10,572,946; 10,475,002; 10,445,708; 10,438,174; 10,417,615; 10,401,411; 10,269,110; 10,157,427; 10,127,647; 10,055,798; 9,885,672; 9,881,284; 8,200,533; 8,195,511; and 7,881,965; U.S. patent application Ser. Nos. 17/445,158; 17/445,083; 17/445,082; 17/125,994, 16/794,009; 16/788,169; 16/788,153; 16/719,699; 16/794,009; 16/601,492; 16/575,090; 16/575,003; 16/556,104; 16/556,018; 16/534,741; 16/357,041; 16/195,785; 15/977,729; 15/901,526; 15/855,320; 15/672,157; 15/641,145; 15/630,460; 15/214,791; 15/091,487; 15/057,707; 14/967,183; 14/966,346; 14/964,963; 14/934,134; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; and U.S. Provisional Application Nos. 63/220,890; 63/220,381; 63/127,148; 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

Aspects of the invention can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the present technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Reference throughout this specification to relative terms such as, for example, "generally," "approximately," and "about" are used herein to mean the stated value plus or minus 10%, unless the context clearly requires otherwise.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in their entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes are at times described as being performed in series, these processes may instead be performed or implemented in parallel or performed at different times.

The teachings of the present technology provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A connector carrier assembly for use with an electronic device recycling kiosk, the connector carrier assembly comprising:
    a support structure;
    a camshaft rotatably coupled to the support structure and including at least one cam lobe; and
    at least one cam follower movably coupled to the support structure, wherein the at least one cam follower includes an electrical connector carrier configured to receive and couple an electrical connector to the at least one cam follower,
    wherein rotation of the camshaft about a longitudinal axis thereof drives the at least one cam lobe against the at least one cam follower to move the at least one cam follower ande ereby-move the electrical connector together relative to the support structure.

2. The connector carrier assembly of claim 1 wherein the at least one cam follower includes a proximal end portion pivotally coupled to the support structure and a distal end portion that holds the electrical connector, and wherein rotation of the camshaft about the longitudinal axis drives the at least one cam lobe against the at least one cam follower to rotate the at least one cam follower about the proximal end portion.

3. The connector carrier assembly of claim 2 wherein the at least one cam follower includes a bearing surface positioned between the proximal end portion and the distal end portion, and wherein rotation of the camshaft about the longitudinal axis drives the at least one cam lobe against the bearing surface to rotate the at least one cam follower about the proximal end portion and move the electrical connector away from the support structure.

4. The connector carrier assembly of claim 1, further comprising a biasing member compressed between the at least one cam follower and the support structure to bias the at least one cam follower toward the at least one cam lobe.

5. The connector carrier assembly of claim 1, further comprising a motor fixedly mounted to the support structure, wherein the motor includes an output shaft operably coupled to the camshaft and configured to rotate the camshaft about the longitudinal axis.

6. The connector carrier assembly of claim 1, further comprising the electrical connector, wherein the electrical connector is a mobile phone connector.

7. The connector carrier assembly of claim 1 wherein the at least one cam follower is a first cam follower configured to hold a first electrical connector, wherein the at least one cam lobe is a first cam lobe, and wherein the connector carrier assembly further comprises:

a second cam follower movably coupled to the support structure and operably coupled to a second electrical connector, wherein the camshaft further includes a second cam lobe, and wherein rotation of the camshaft about the longitudinal axis drives the second cam lobe against the second cam follower to thereby move the second electrical connector relative to the support structure.

8. The connector carrier assembly of claim 7 wherein the first and second cam lobes are diametrically opposed about the longitudinal axis.

9. The connector carrier assembly of claim 1, further comprising a biasing element positioned to act on the at least one cam follower and bias the at least one cam follower toward a first direction, wherein the rotation of the camshaft moves the at least one cam follower in a second, opposite direction.

10. The connector carrier assembly of claim 9 wherein the biasing element is at least one of a compression spring, a tension spring, or a torsion spring.

11. The connector carrier assembly of claim 1 wherein the at least one cam follower includes a first end portion proximal the at least one cam lobe, and a second end portion opposite the first end portion and including the electrical connector, the first and second end portions defining a cam follower longitudinal axis, and wherein rotation of the camshaft about the longitudinal axis drives the at least one cam lobe against the first end portion to move the at least one cam follower linearly along the cam follower longitudinal axis.

12. A kiosk for purchasing mobile phones from users, the kiosk comprising:
an inspection area having-
an inspection tray configured to receive a mobile phone; and
a connector carrier assembly positioned proximate the inspection tray, the connector carrier assembly including:
a support structure;
a camshaft rotatably mounted to the support structure and having at least one cam lobe; and
a cam follower movably coupled to the support structure, wherein the cam follower includes an electrical connector carrier configured to receive and couple and electrical connector to the cam follower,
wherein rotation of the camshaft about a longitudinal axis thereof drives the at least one cam lobe against the cam follower to move the cam follower and the electrical connector together relative to the support structure and thereby position the electrical connector for connection to the mobile phone.

13. The kiosk of claim 12 wherein the cam follower is a first cam follower configured to hold a first electrical connector, wherein the at least one cam lobe is a first cam lobe, and wherein the connector carrier assembly further comprises:
a second cam follower movably coupled to the support structure and operably coupled to a second electrical connector, wherein the camshaft further includes a second cam lobe, and wherein rotation of the camshaft about the longitudinal axis drives the second cam lobe against the second cam follower to thereby move the second electrical connector relative to the support structure.

14. The kiosk of claim 12 wherein the cam follower includes a proximal end portion pivotally coupled to the support structure and a distal end portion that holds the electrical connector, and wherein rotation of the camshaft about the longitudinal axis drives the at least one cam lobe against the cam follower to rotate the cam follower about the proximal end portion.

15. The kiosk of claim 12 wherein the cam follower includes a first end portion proximal to the at least one cam lobe, a second, opposite end portion including the electrical connector, the first and second end portions defining a cam follower longitudinal axis, and wherein rotation of the camshaft about the longitudinal axis drives the at least one cam lobe against the first end portion to move the cam follower linearly along the cam follower longitudinal axis.

16. A method for operating a kiosk, the method comprising:
receiving information that corresponds to a configuration of an electrical connector receptacle of an electronic device;
identifying an electrical connector of a connector carrier assembly, the electrical connector configured to be releasably received by the electrical connector receptacle;
rotating a camshaft of the connector carrier assembly to drive a cam lobe of the camshaft against a cam follower operably coupled to a support structure of the connector carrier assembly, wherein the cam follower includes an electrical connector carrier configured to receive and couple the electrical connector to the cam follower; and
moving the cam follower and the electrical connector together relative to the support structure and thereby extend the electrical connector for connection to the electronic device.

17. The method of claim 16 wherein moving the cam follower includes extending the electrical connector at least partially through an opening in an inspection tray of the kiosk.

18. The method of claim 16, further comprising:
prompting, via a display of the kiosk, a user of the kiosk to connect the electronic device to the kiosk via the identified electrical connector; and
when the electrical connector is connected to the electronic device, rotating the camshaft such that a biasing element operably coupled to the cam follower drives the identified electrical connector in a second, opposite direction to disconnect the electrical connector from the electronic device.

19. The method of claim 16 wherein identifying the electrical connector includes selecting, based on the received information, one of a plurality of electrical connectors.

20. The method of claim 16 wherein moving the cam follower includes pivoting a first end portion of the cam follower about a second end portion of the cam follower, the first end portion including the electrical connector.

21. The method of claim 16 wherein moving the cam follower includes translating the cam follower linearly along a longitudinal axis thereof.

22. The method of claim 16 wherein receiving the information that corresponds to the configuration of the electrical connector receptacle includes receiving information from a wireless charger of the kiosk.

23. The method of claim 16 wherein receiving the information that corresponds to the configuration of the electrical connector receptacle includes receiving, in response to a request, the information from a user of the kiosk.

* * * * *

UNITED STATES PATENT AND TRADEMARK OFFICE
CERTIFICATE OF CORRECTION

| | | |
|---|---|---|
| PATENT NO. | : 12,475,756 B2 | Page 1 of 1 |
| APPLICATION NO. | : 17/445178 | |
| DATED | : November 18, 2025 | |
| INVENTOR(S) | : Babak Forutanpour et al. | |

It is certified that error appears in the above-identified patent and that said Letters Patent is hereby corrected as shown below:

On the Title Page

On Page 9, Column 1 item (56) ("Other Publications"), Line 40, delete "recylcing,"" and insert -- recycling," -- therefor.

In the Specification

In Column 8, Line 30, delete "5B." and insert -- 5B, -- therefor.
In Column 13, Line 51, delete "Glass™" and insert -- Glass™, -- therefor.

In the Claims

In Column 16, Line 33, Claim 1, delete "ande ereby-move" and insert -- and -- therefor.

Signed and Sealed this
Thirteenth Day of January, 2026

John A. Squires
*Director of the United States Patent and Trademark Office*